Dec. 26, 1950 J. H. VOSS ET AL 2,535,764

RELAY AUTOMATIC TELEPHONE SYSTEM

Filed Jan. 8, 1947 20 Sheets-Sheet 1

INVENTORS.
JOHN H. VOSS
ROY W. JONES

BY Chas. W. Candy

ATTORNEY

INVENTORS.
JOHN H. VOSS
ROY W. JONES
BY
Chas. L. Candy
ATTORNEY

INVENTORS.
JOHN H. VOSS
ROY W. JONES
BY
Chas. W. Candy
ATTORNEY

INVENTORS.
JOHN H. VOSS
ROY W. JONES
BY
Chas. W. Candy
ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 5

INVENTORS.
JOHN H. VOSS
ROY W. JONES

BY Chas. W. Candy

ATTORNEY

INVENTORS.
JOHN H. VOSS
ROY W. JONES
BY
Chas. W. Cory
ATTORNEY

INVENTORS.
JOHN H. VOSS
ROY W. JONES
BY
Chas. W. Candy
ATTORNEY

INVENTORS.
JOHN H. VOSS
ROY W. JONES
BY
Chas. L. Cary
ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 9

INVENTORS.
JOHN H. VOSS
ROY W. JONES
BY
Chas. W. Candy
ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 10

INVENTORS.
JOHN H. VOSS
ROY W. JONES

BY Chas. W. Candy

ATTORNEY

INVENTORS.
JOHN H. VOSS
ROY W. JONES

BY Chas. W. Candy
ATTORNEY

RELAY AUTOMATIC TELEPHONE SYSTEM

Filed Jan. 8, 1947 20 Sheets-Sheet 12

INVENTORS.
JOHN H. VOSS
ROY W. JONES
BY Chas. W. Candy
ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 13

INVENTORS.
JOHN H. VOSS
ROY W. JONES

BY Chas. W. Candy

ATTORNEY

INVENTORS.
JOHN H. VOSS
ROY W. JONES
BY
Chas. W. Candy
ATTORNEY

RELAY AUTOMATIC TELEPHONE SYSTEM

Filed Jan. 8, 1947 20 Sheets-Sheet 15

*INVENTORS.*
JOHN H. VOSS
ROY H. JONES
*BY*
Chas. W. Candy
ATTORNEY

INVENTORS.
JOHN H. VOSS
ROY H. JONES
BY
Chas. L. Candy
ATTORNEY

INVENTORS.
JOHN H. VOSS
ROY W. JONES
BY Chas. W. Candy
ATTORNEY

Dec. 26, 1950

J. H. VOSS ET AL 2,535,764

RELAY AUTOMATIC TELEPHONE SYSTEM

Filed Jan. 8, 1947

20 Sheets-Sheet 18

INVENTORS.
JOHN H. VOSS
ROY W. JONES

BY Chas. W. Candy

ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 19

INVENTORS.
JOHN H. VOSS
ROY W. JONES

BY Chas. W. Candy

ATTORNEY

Dec. 26, 1950 J. H. VOSS ET AL 2,535,764

RELAY AUTOMATIC TELEPHONE SYSTEM

Filed Jan. 8, 1947 20 Sheets-Sheet 20

*INVENTORS.*
JOHN H. VOSS
ROY W. JONES

BY [signature]

ATTORNEY

Patented Dec. 26, 1950

2,535,764

UNITED STATES PATENT OFFICE 2,535,764

RELAY AUTOMATIC TELEPHONE SYSTEM

John H. Voss and Roy W. Jones, Rochester, N. Y., assignors to Automatic Electric Laboratories, Inc., Chicago, Ill., a corporation of Delaware Application January 8, 1947, Serial No. 720,756

14 Claims. (Cl. 179—18)

Figure 1:
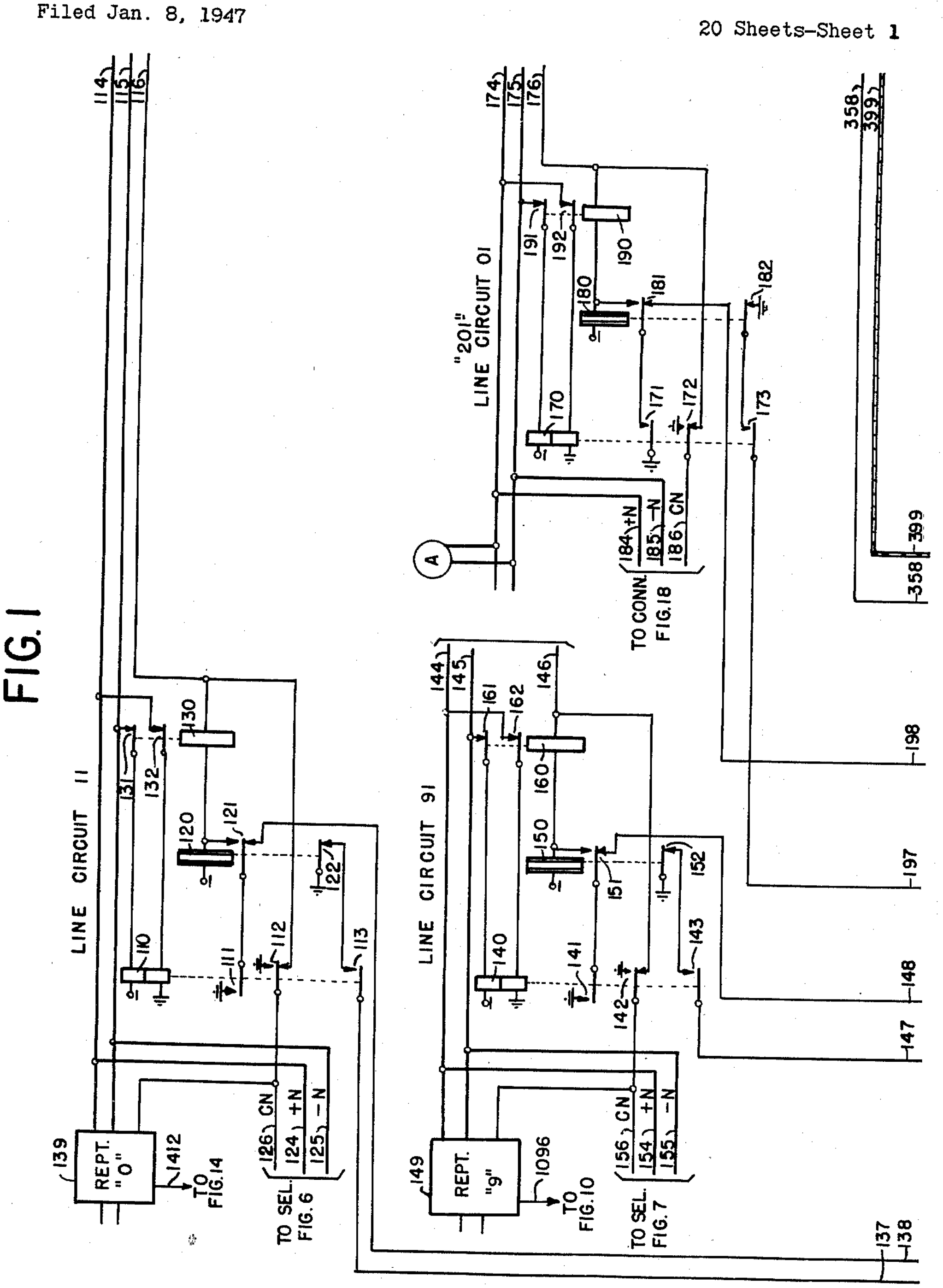

This invention relates in general to telephone systems, but more particularly to automatic telephone systems of the all relay type similar to that described in U. S. Patent 2,491,291 issued to the same applicants on December 13, 1949.

Systems of this type, commonly known as community automatic exchanges or C. A. X's, are generally employed in small communities, and for this reason they are generally limited to a comparatively small number of lines, including multiparty lines requiring code signalling. Facilities for making reverting calls must therefore be provided. Also, since there is generally no operator in attendance, ready access must be provided to operators in nearby exchanges. Conversation timing may be required, with automatic discriminating service to prevent such timing in the case of a call from a toll or a supervising operator. Also, some means whereby a toll operator may cut in on a busy line for verification service, is usually necessary. Again, some means whereby an operator in another exchange may exercise supervision over such an exchange by dialling a special alarm number over the inter-office trunks, is often required.

In the aforementioned Patent 2,491,291 many of these and other features were shown as applied to an all-relay connector system of this class, employing 200-line connectors with high speed trunk selecting equipment common thereto for automatically selecting idle inter-office and P. B. X trunks in response to the dialling of the proper trunk group number. The present invention shows some of these features applied to a selector system of the same class having a maximum capacity in excess of 200 lines, including 20-party subscriber lines, four-digit 100-line connectors, plural groups of regular selectors, and a group of special incoming switching-through selectors.

It is, therefore, the main object of the present invention to provide improved means for automatically selecting local trunks to idle connectors, or idle inter-office and toll trunks as required, in an all-relay selector system of the character described, in which the trunk selecting equipment is external to and common to the selectors, and is associated only briefly therewith during the setting up of a call.

Another object of the invention is the prevention of simultaneous seizures of the same trunk selecting equipment by two or more selectors, or the simultaneous connection of two calls to the same trunk.

Another object of the invention is the retention of the same high speed of operation, with plural access channels as required, so that calls will not be appreciably delayed at any time.

One feature of our invention for accomplishing the foregoing objects, is the provision, in the trunk selecting equipment, of a plurality of groups of "trunk access" relays, a plurality of groups of "trunk group" relays, and a plurality of groups of "trunk select" relays, operating in the same general manner as similar relays in the previously mentioned patent.

Another feature of the invention is the division of the selectors into groups, with a separate group of "trunk access" relays for each selector group, a separate "access" relay being provided in each "trunk access" group for each selector in the associated selector group, together with a chain circuit to permit the "access" relays of such group to be operated only one at a time, in order to prevent simultaneous seizure of an access relay group by two selectors in the same selector group.

Another feature of the invention is the division of the connectors and trunks into groups, with a separate group of "trunk group" relays for each such connector group or trunk group, and a separate relay in each such relay group for each selector group. A chain circuit in each such relay group serves to permit only one such relay to be operated at a time in any one relay group, in order to prevent two or more calls from different selector groups being given simultaneous access to a given group of connectors or trunks. A separate group of "trunk select" relays is also provided for each connector group and trunk group, with a separate "select" relay in such select relay group, for each connector or trunk in the group, and means to permit only one such relay to be operated at a time in each group, in order to permit seizure of only one trunk by a call.

A further feature of the invention is the provision of an additional group of "trunk access" relays for each selector group for permitting immediate access to a "heavy traffic" trunk group such as a toll group, without regard to other calls being made to other trunk groups at the same time through the regular trunk access relay groups previously mentioned. These additional "trunk access" relays are associated only with the "trunk group" relays of the heavy traffic trunk group, which operate similarly to the regular trunk group relays already mentioned, and likewise contain a separate group relay for each selector group.

Still another feature is the use of special incoming selectors without any tens relays for giving direct access to the toll trunks on calls from toll operators or the like at another automatic exchange, without the need of dialling any extra digit for switching through the C. A. X. These special selectors are provided with their own group of "trunk access" relays and a separate group relay in the "heavy traffic" group of "trunk group" relays.

Other objects and features of the invention will be apparent from the specification and claims, considered in conjunction with the accompanying drawings which show one embodiment of the invention applied to a 1,000 line all relay system of the class described, it being understood that various modifications may be made in the arrangement shown without departing from the spirit and scope of the invention.

Figure 21:
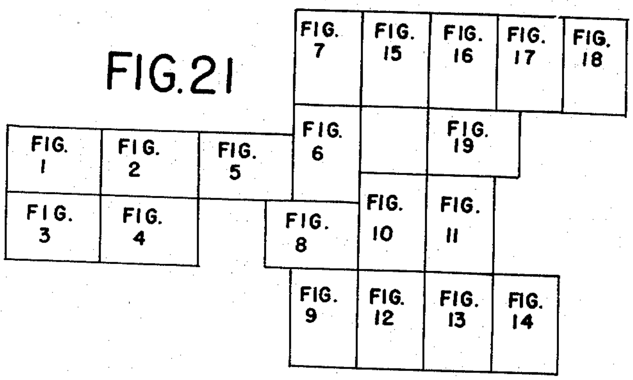

With reference to the drawings comprising Figures 1 to 19 inclusive, there is shown therein, by means of the usual circuit diagrams, sufficient of the apparatus of an automatic telephone system including this invention, to enable the said invention to be described and understood. Figure 20 diagrammatically illustrates the basic trunking arrangement, while Figure 21 indicates the manner in which the various circuit drawings should be arranged with respect to one another, in order to trace out in detail, the operation of the system.

The trunking diagram of Figure 20 shows, without circuit details, the basic relationships of the various main parts of the system, with proper reference to the corresponding circuit drawings previously mentioned. The system may be said to consist primarily, in a plurality of finder-selector links of the all-relay type, such as the finder 2050 and the selector 2051, each selector having access to a plurality of all-relay connectors such as the connectors 2044 and 2047, and also to a plurality of groups of trunk lines leading to other exchanges such as the manual central office 2020 and the toll office 2021 at the upper left of the drawing, by way of two-way repeaters such as 2030 and 2031. For originating calls, these trunks, together with the subscriber lines of the system, two of which are shown at "A" and "B," terminate in the usual line circuits such as indicated by the rectangles 2040, 2041, 2042 and 2045, which in turn give access to the associated linefinders. The subscriber lines are of course accessible only through the connectors.

The finder-selector links, as previously mentioned, are divided into groups, one of which is indicated above the central broken line in the drawing and another below the same line. A separate allotter and control unit such as 2043 and 2046 is indicated for each group. The incoming switching-through selectors 2054 and 2064 shown at the bottom of the sheet, may be considered as an additional selector group, but serve only for through calls from a main automatic exchange or M. A. X such as 2022, by way of individual one way trunks and repeaters such as the repeater "X." The horizontal lines above or below the finders, selectors and connectors represent the various paths or channels through the contacts of the tens and units relays of these switches.

The units relays in all of the selectors are controlled automatically, in response to the first digit dialled, by the associated "trunk access," "trunk group" and "trunk select" relays, such as shown on the right of the drawing. A call from the first group of selectors to the 200 group of connectors, for example, would affect the "trunk access" relays 2070, the "trunk group" relays 2080, and the "trunk select" relays 2090, while a call from the second selector group to the same connector group would affect "trunk access" relays 2072 and the relays 2080 and 2090. Similarly, a call from the first selector group to the 300 connector group would utilize the trunk access, group, and select relays 2070, 2081 and 2091; a call from the second selector group to the same connector group would affect trunk access relays 2072 and the relays 2081 and 2091; while a call to the "9" trunk group would involve the trunk group relays 2082 and the trunk select relays 2092, together with the trunk access relays of the proper selector group as before. A call to the toll trunk group, on the other hand, would involve the trunk group and trunk select relays 2083 and 2093 together with one of the heavy traffic trunk access units, such as 2071, 2073 or 2074, depending on the origin of the call.

To summarize the operation briefly, if subscriber A in the 200 group desires to call subscriber B in the 300 group, the initiation of the call causes the associated line circuit 2040 to mark line A as calling in the allotter 2043. The allotter 2043 in response to this marking, seizes a free linefinder such as the finder 2050, and operates the proper tens and units relays therein to extend the calling line to the associated selector 2051. Subscriber A then dials the first digit of the call number of station B, in this case a "3," and thereby causes the operation of the corresponding tens relay in the selector. This operated tens relay then causes the momentary seizure of the trunk access relays 2070, the trunk group relays 2081, and the trunk select relays 2091 which relays in turn control the operation of the selector units relays to select the first idle connector such as connector 2047 in the 300 group of connectors, by way of the inter-switch trunk cable 2000. The remaining digits of the call number then cause the connector tens and units relays to complete the connection to the called line by way of the cable 2001, in the usual manner.

If subscriber A wishes to call the manual office 2020, the initiation of the call will again cause the line circuit 2040 and the allotter 2043 to seize an idle linefinder, such as the finder 2060, which thereupon extends the calling line to the associated selector 2061. Subscriber A then dials the single digit "9," and the corresponding tens relay in the selector is operated, to seize the trunk access relay 2070, the trunk group relays 2`82 and the trunk select relays 2092. These relays in turn cause the operation of the proper units relay in the selector 2061 to extend the call to the first idle trunk to the manual office, by way of the cable 2002. Similarly, to call the toll office 2021, subscriber A will dial the single digit "0," to operate the corresponding tens relay in the selector involved, which relay causes the momentary seizure of the heavy traffic trunk access relays 2071, the toll trunk group relays 2083 and the toll trunk select relays 2093. These latter relays then operate the selector units relays to extend the call to the first idle trunk to the toll office by way of the cable 2003. Calls from the subscriber B, and also incoming calls from the manual and toll offices, function similarly. On a call from the M. A. X 2022 however, the selectors are seized direct from the repeaters, and in turn immediately seize the associated trunk access relays 2074 and the trunk group and trunk select relays 2083 and 2093. These latter relays in turn cause the immediate operation of the selector units relays to switch the call through to an idle toll trunk, by way of cable 2003. No dialing is involved.

Figure 2:
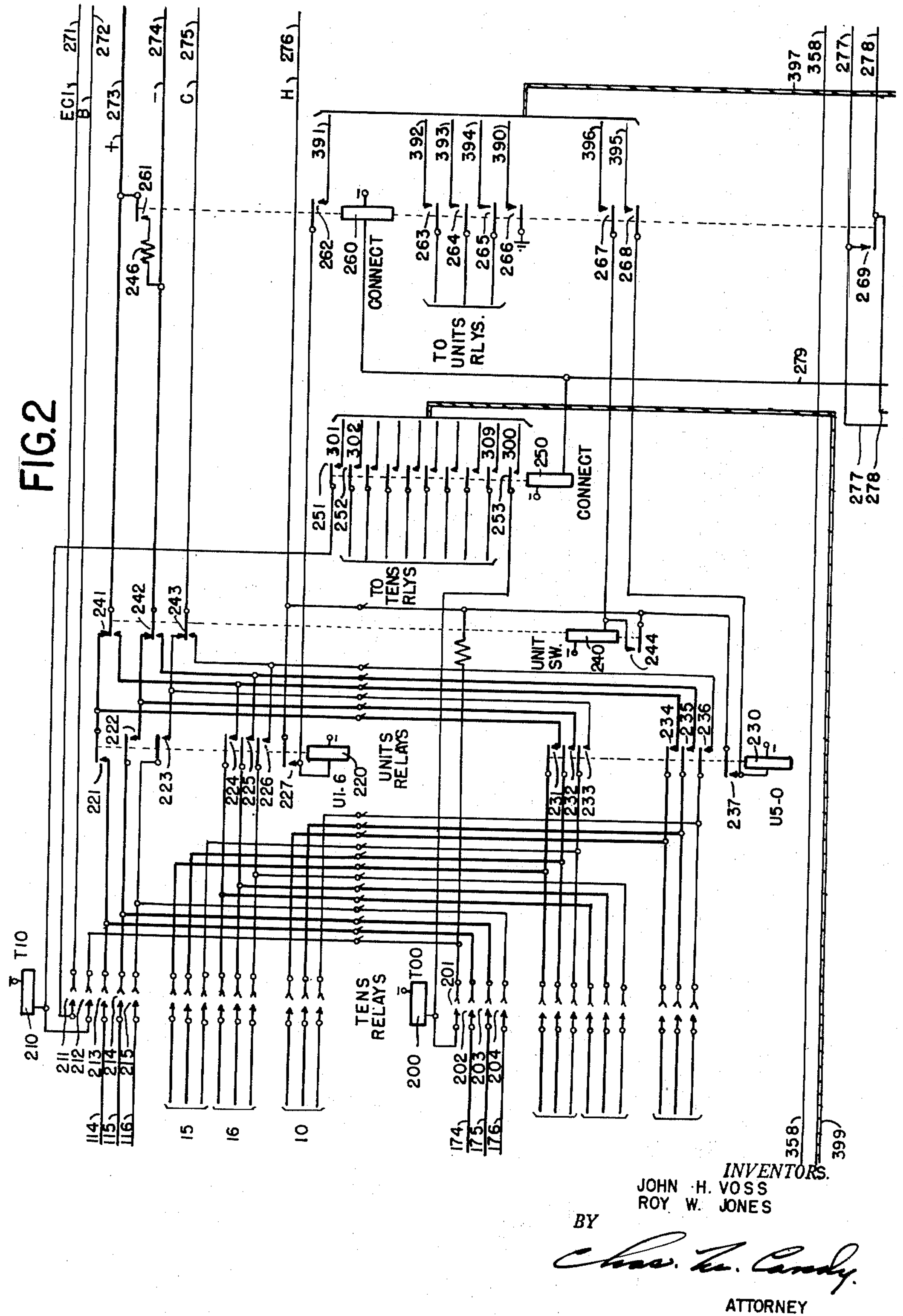
Figure 3:
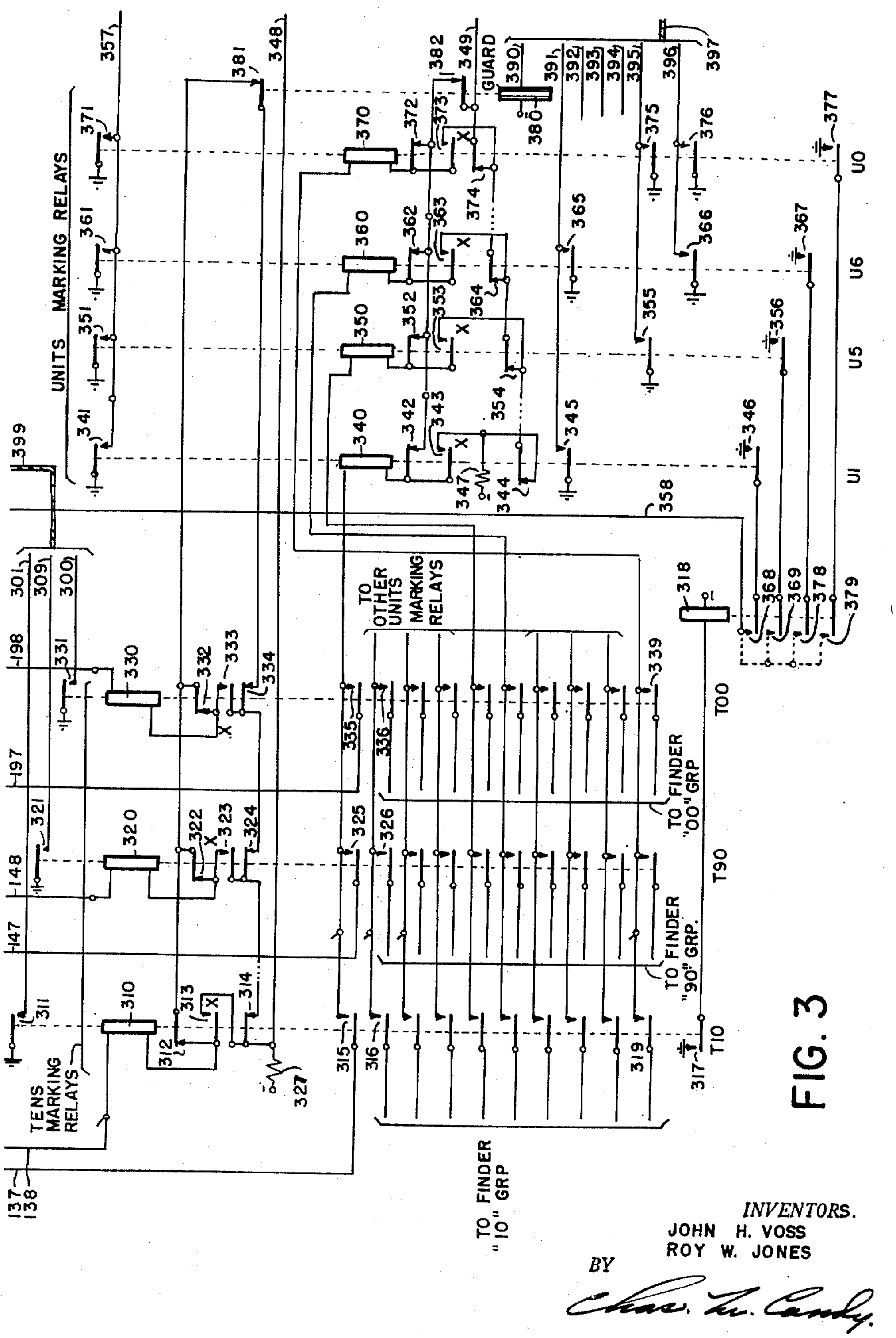
Figure 4:
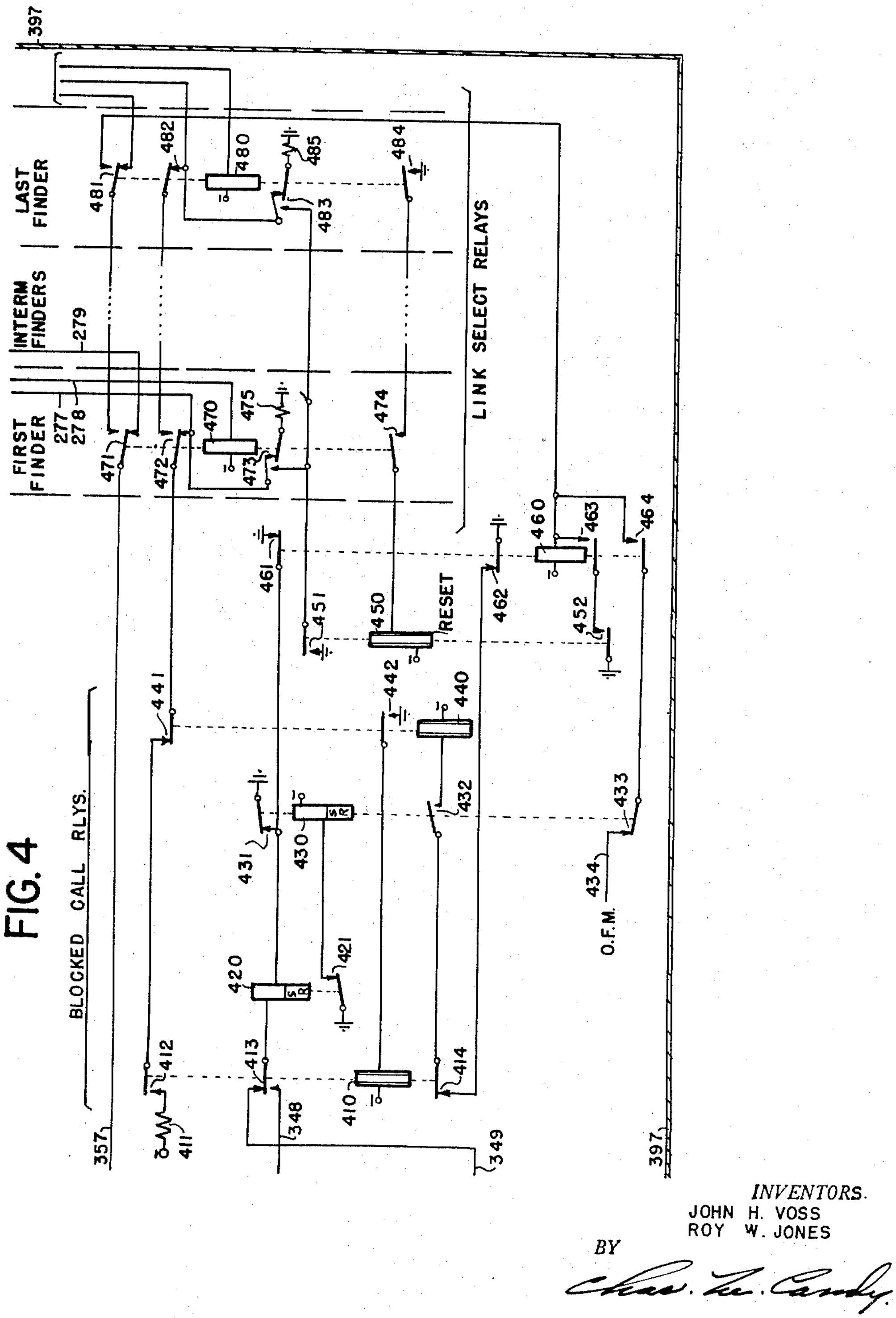

In the circuit drawings, Figure 1 shows a portion of the line circuits, and Figure 2 a linefinder for one of the finder-selector links of the system, while Figures 3 and 4 show the common control and allotter relays for operating the finders of the associated finder group. Similarly, Figures 5, 6, 7 and 8 show the selector end of the same link, Figure 9 shows one of the incoming selectors, and Figures 10, 11, 12, 13 and 14 form a part of the selector trunk-selecting equipment. A connector is shown in Figures 15, 16, 17, 18 and 19.

To describe the equipment shown in the various circuit drawings in greater detail, Figure 1 shows three three-relay line circuits each comprising a "line" relay, such as relays 110, 140 and 170, a "line cutoff" relay, such as the relays 130, 160 and 190, and a "line lockout" relay, such as the relays 120, 150 and 180. The line circuit on the upper left is shown connected to a toll trunk repeater 139, with a multiple to the corresponding terminals on the tens relays of the selectors such as the upper terminals of the relay 600 in Figure 6. The line circuit on the lower left is shown connected to an inter-office trunk repeater 149, with a multiple also to corresponding terminals of the selector tens relays, such as the upper terminals of tens relay 790 in Figure 7. The line circuit on the lower right on the other hand, is shown connected to a subscriber line having a subscriber station "A" and other stations, said line circuit being multipled to corresponding terminals of the connector tens relays, such as the upper terminals of tens relay 1800 in Figure 18.

Figure 2 shows one of the linefinders serving the line circuits of Figure 1, and includes the "tens" relays 210 and 200, the "units" relays 220 and 230, a "units switching" relay 240, and two "connect" relays 250 and 260. A fully equipped linefinder would normally be provided with ten "tens" or group relays each serving ten lines or trunks, and five units relays each providing access to two of the lines or trunks connected to the contacts of each tens relay. The units switching relay divides each group of ten lines or trunks into the high-low sub-groups 1 to 5 and 6 to 0, and selects one of the two lines selected by any operated tens and units relays. If the units switching relay remains normal, the selection will be in the 1 to 5 sub-group, while if it is operated, the selection will be in the 6 to 0 sub-group, in the selected tens group.

Figure 3 shows part of the finder control relays, comprising relays 310 to 380 inclusive. Relays 310, 320 and 330 represent three out of ten "tens marking" relays which are operated from the line circuits of the associated group, and control in turn the finder tens relays. Relays 340, 350, 360 and 370 are four of ten "units marking" relays, which also operate from the line circuits, through make contacts on the operated tens marking relays, and control in turn the finder units and units-switching relays as required. Relay 318 is a "discriminating" relay, which serves to identify calls from a toll operator to the selectors, and relay 380 is a "guard" relay which operates from the finder connect relays to guard the pull up circuits of the tens and units marking relays.

Figure 4 shows some additional relays for the finder control unit together with two of the "allotter" or "link select" relays. Relays 410, 420, 430, and 440 are "blocked call" relays which serve to disengage a seized link and pass a call to the next idle link whenever a called line is not cut through promptly; relay 450 is a "reset" relay which operates upon the seizure of the last link in the group to reset the allotter; and relay 460 is an "overflow" relay which operates upon the initiation of a call if all links are busy, to operate an overflow meter. Relays 470 and 480 are two of the "link select" relays, which preselect the next idle link to be assigned on the next call from any line or trunk in this group. These relays, one of which is provided for each link, are normally energized, and release in turn as the corresponding links become engaged. When the last link is seized, the reset relay re-operates all link select relays whose associated links are again free, to thereby again pre-select the first available link.

Figure 5:
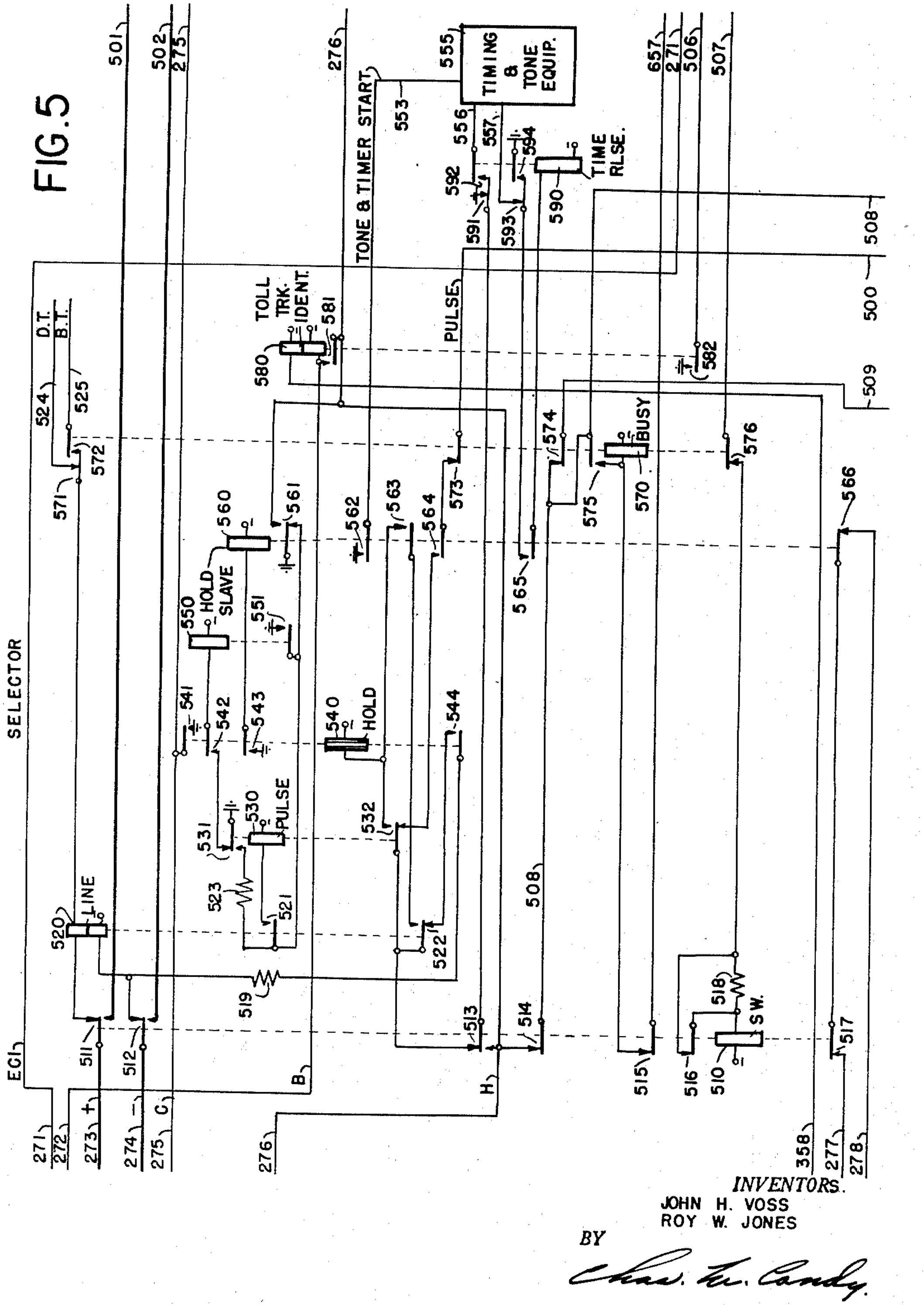

In Figure 5 are shown the miscellaneous control relays of the selector including a "switching" relay 510, a "line" relay 520, a "pulsing" relay 530, a "hold" relay 540, a "pulse control" relay 550, a "hold slave" relay 560 under the direct control of hold relay 540, a "busy" relay 570, a "toll trunk identification" relay 580 which operates from the discriminating relay 318 on calls from a toll operator, and a "permanent time release" relay 590, which causes the automatic release of the link after an interval in case dialing does not follow seizure, or the call is not switched through promptly.

Figure 6:
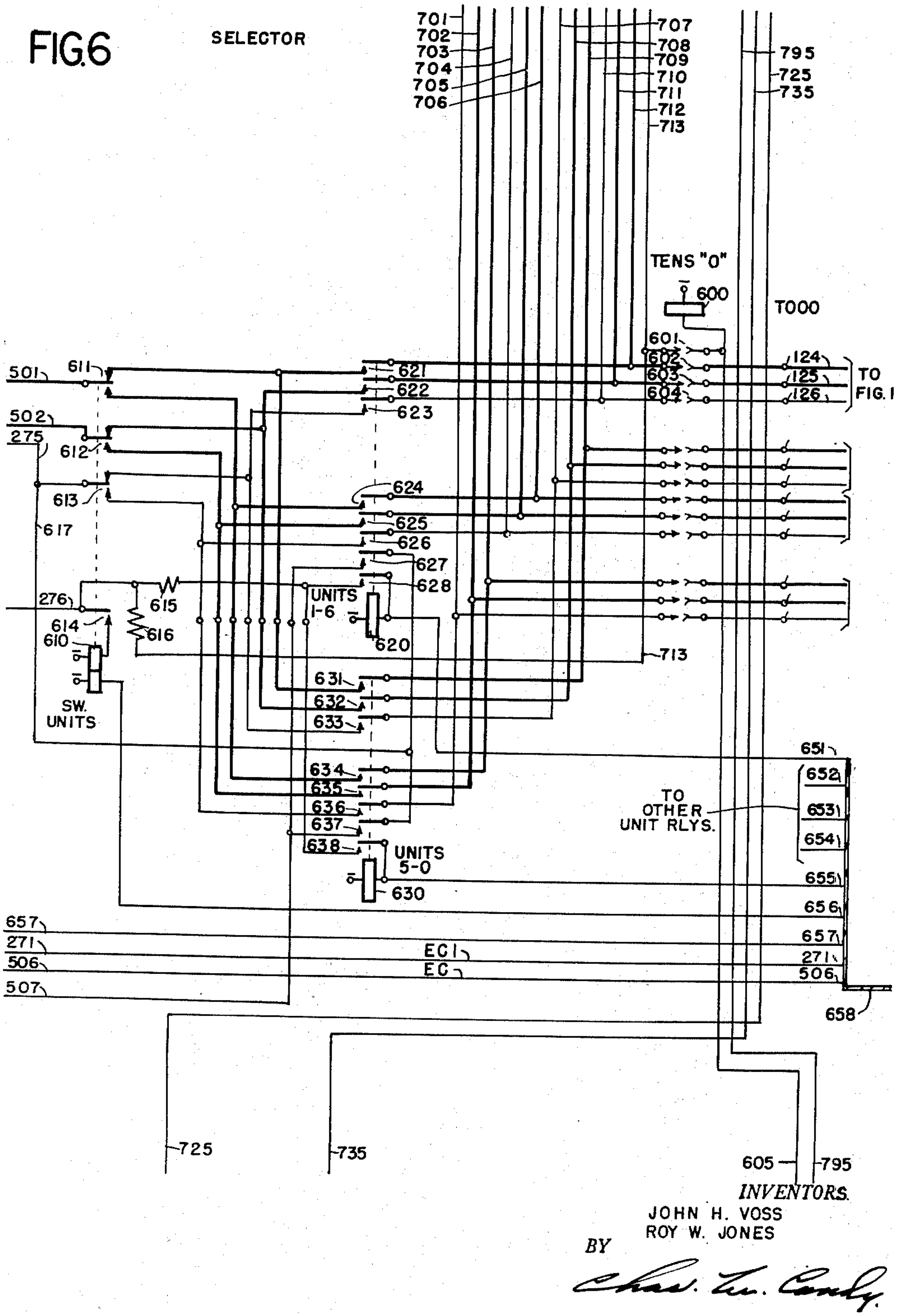
Figure 7:
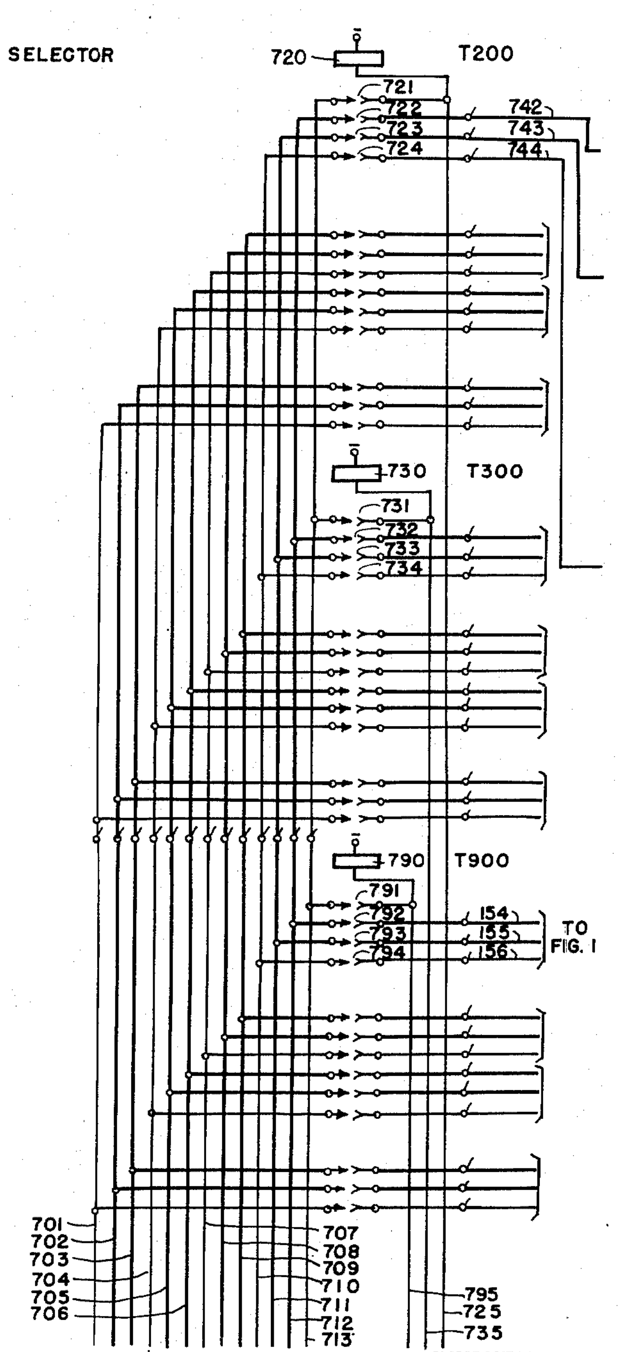

In Figures 6 and 7 are shown a portion of the selector "tens" and "units" relays, which are like those of the finder, relay 610 being the "units-switching" relay, and relays 620 and 630 being two of the five "units" relays, while relays 720, 730, 790 and 600 are four of the "tens" relays. The tens relay 720 provides access to the ten, or less, connectors of the 200 group, while the tens relay 730 gives access to the connectors of the 300 group of connectors. Other tens relays, not shown, give access similarly to other groups of connectors. The tens relay 790 provides access to the group of trunk lines extending to the distant manual office, designated 2020 in Figure 20, while tens relay 600 gives access to the group of trunk lines leading to the toll office designated 2021 in Figure 20. These tens relays are operated from the selector "counting" relays of Figure 8, while the units relays are operated automatically from the trunk selecting equipment, or both local and trunk calls. The selector counting relays operate from the pulsing relay 530, and consist of the ten round numbered counting relays 810 to 800, and the three "counting control" relays 816, 817 and 818, together with a transfer relay 819.

Figure 9 shows one of the incoming selectors terminating one of the trunks from the distant automatic office designated 2022 in Figure 20, although this could also be a manual office. These selectors, which serve to extend operator calls from this office direct to the toll trunks leading to the distant toll office immediately upon seizure, consist only of a few control relays, a units-switching relay and five units relays. Relay 910 is a "switching" relay, relay 920 a "line" relay, relay 930 a "hold" relay, relay 940 a "busy" relay, relay 950 is the "units-switching" relay, and relays 960 and 970 are the 1–6 and the 5–0 units relays respectively, the other units relays not being shown. A similar selector is represented by the rectangle 909, at the bottom of the sheet.

Figure 10:
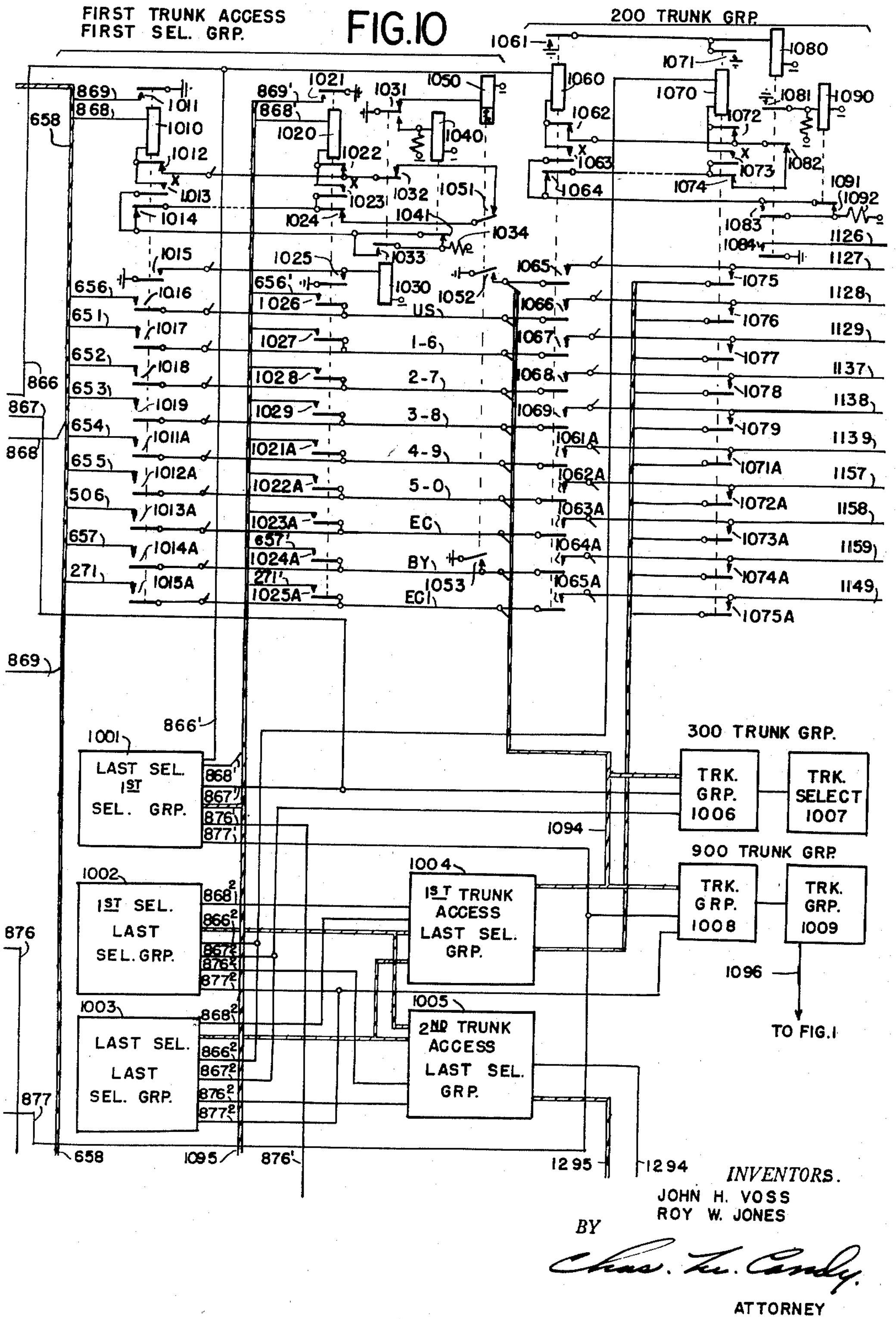

At the upper left in Figure 10 are shown the regular "trunk access" relays associated with the selectors of the first group. In this relay group, one "access" relay such as 1010 or 1020 is provided, for each selector in the selector group, relay 1010 for example, being associated with the first selector of the first selector group, shown in Figure 5, 6, 7 and 8, and relay 1020 being associated with the last selector of this group, indicated by the rectangle 1001 at the lower left in Figure 10. These relays operate momentarily when seized by an associated selector, and connect the "units marking" leads and certain other control leads from the selector through to a group of "trunk group" relays, such as shown on the right side of Figure 10. Relays 1030 and 1040 are "lockout" relays which operate momentarily whenever any "access" relay in this group operates, and open the pull-up circuit of the other access relays of the group. Relay 1050 is a normally energized "kickoff" relay which releases if an extended call is not cut through promptly, thereby to give the busy signal and preselect the next idle trunk. The first and last selectors of the last selector group are represented by the rectangles 1002 and 1003 at the lower left on this sheet, while the regular and heavy traffic trunk access relays for the last selector group are indicated by the rectangles 1004 and 1005.

At the upper right in Figure 10 are shown the "trunk group" relays for the 200 group of connectors, a "group" relay such as 1060 or 1070 being provided therein for each group of selectors. These relays operate from the selector counting relays in response to the dialling of a first digit "2," and extend the units marking and other control leads from the "trunk access" relays involved through to the 200 connector group "trunk selecting" relays of Figure 11. Relay 1060 will operate on a first digit "2" to any selector in the first group of selectors to connect Figure 11 to the upper trunk access relays, and relay 1070 will operate on a first digit "2" to any selector in the last group of selectors to connect Figure 11 to the trunk access relays 1004. Relays 1080 and 1090 are "lockout" relays like relays 1030 and 1040, and serve similarly to help prevent two group relays in the same group from being operated at the same time. The "trunk group" relays for the 300 group of connectors are represented by the rectangle 1006 on the lower right, and are operated similarly by a first digit "3" to any regular selector to seize the corresponding trunk select relays, here indicated by the rectangle 1007. The "trunk group" and "trunk select" relays for trunk group "9" are similarly represented by the rectangles 1008 and 1009 and will respond to a first digit "9" to any selector.

Figure 11:
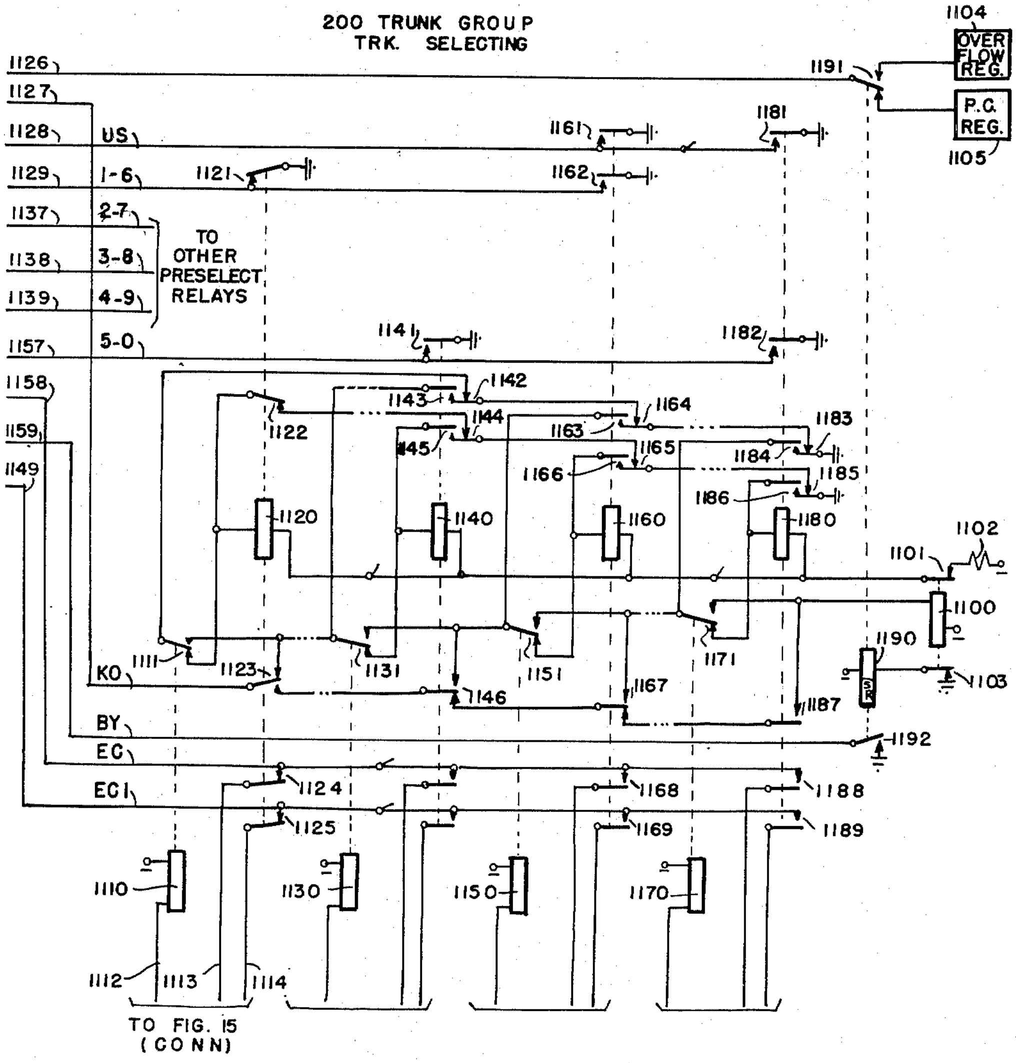

Figure 11, as already mentioned, shows the trunk select relays for the 200 group of connectors. In this circuit, a "trunk busy" relay such as 1110, 1130, 1150 or 1170 is provided, for each connector in the group, up to a maximum of ten. Each of these relays is normally operated through break contacts in the associated connector, and releases whenever such connector is seized by a call, or otherwise made busy. A "preselect" relay such as 1120, 1140, 1160 or 1180 is also provided for each connector in the group. These relays operate one at a time in rotation as the connectors are successively taken into use, to preselect the next idle connector. As each preselect relay operates it releases the preceding relay and prepares an operate circuit for the proper units relay or relays in the seizing selector. Relay 1190 is an "all trunks busy" relay and relay 1100 is a "reset" relay which operates upon the seizure of the last trunk to reset the preselect chain. Preselect and busy relays are shown for the first, fifth, sixth and tenth trunks only, the others being identical with those shown.

Figure 12:
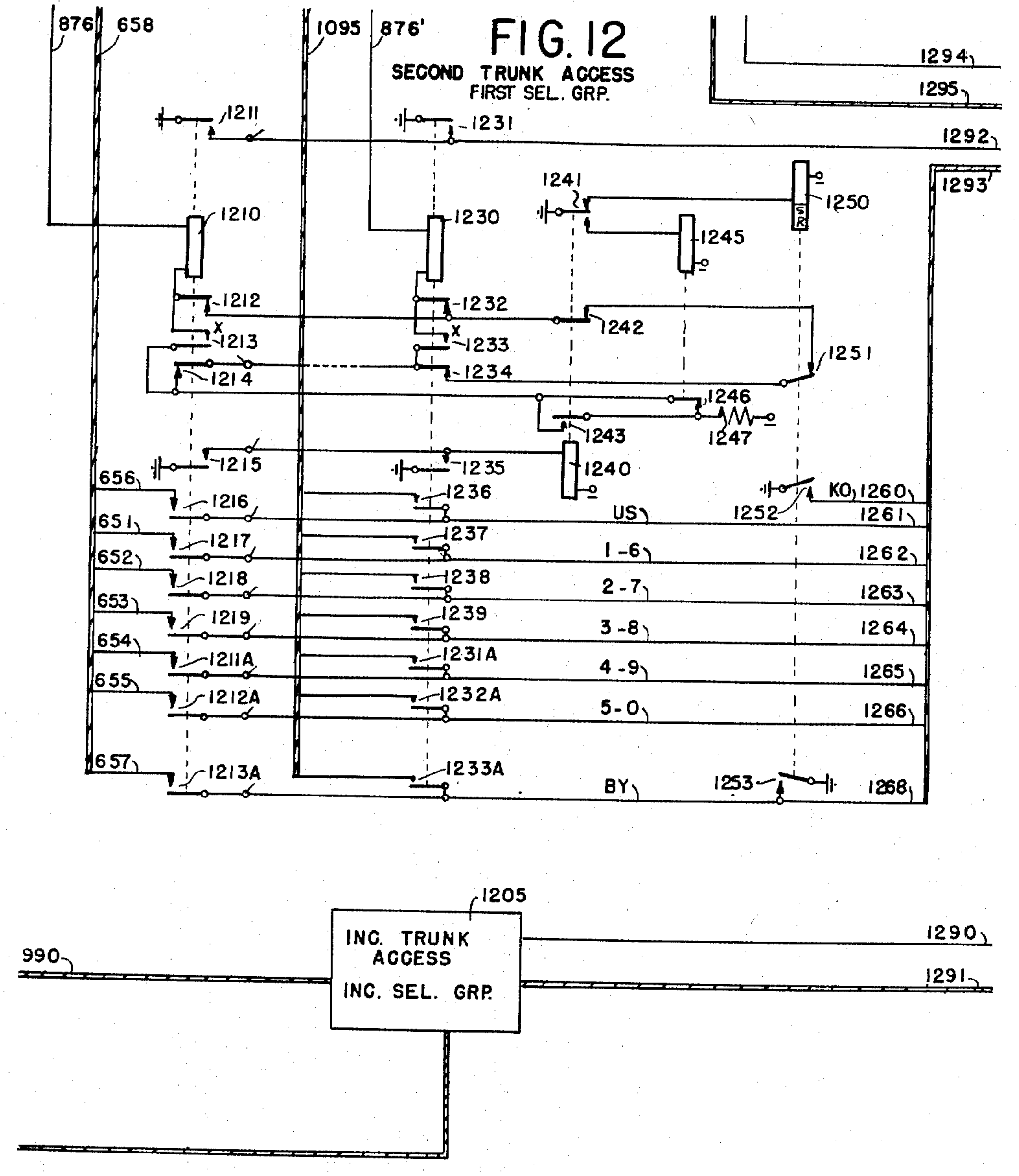

Figure 12 shows the heavy traffic "trunk access" relays associated with the first group of selectors. In this circuit, which is only slightly different from the regular "trunk access" relay circuit, an "access" relay such as 1210 or 1230 is provided for each selector in the associated selector group, relay 1210 being controlled for example, from the first selector of Figures 5, 6, 7 and 8, and relay 1230 being controlled from the last selector 1001 of the same selector group. These relays upon operating extend the units marking leads from the selector through to the heavy traffic "trunk group" relays of Figure 13. Relays 1240, 1245 and 1250 are "lockout" and "kickoff" relays, which function like the corresponding relays 1030, 1040 and 1050 of Figure 10. In the lower part of Figure 12, the rectangle 1205 represents another group of heavy traffic trunk group relays similar to the foregoing, but controlled from the incoming selectors. The heavy traffic trunk access relays 1005 of Figure 10 are also similar.

Figure 13:
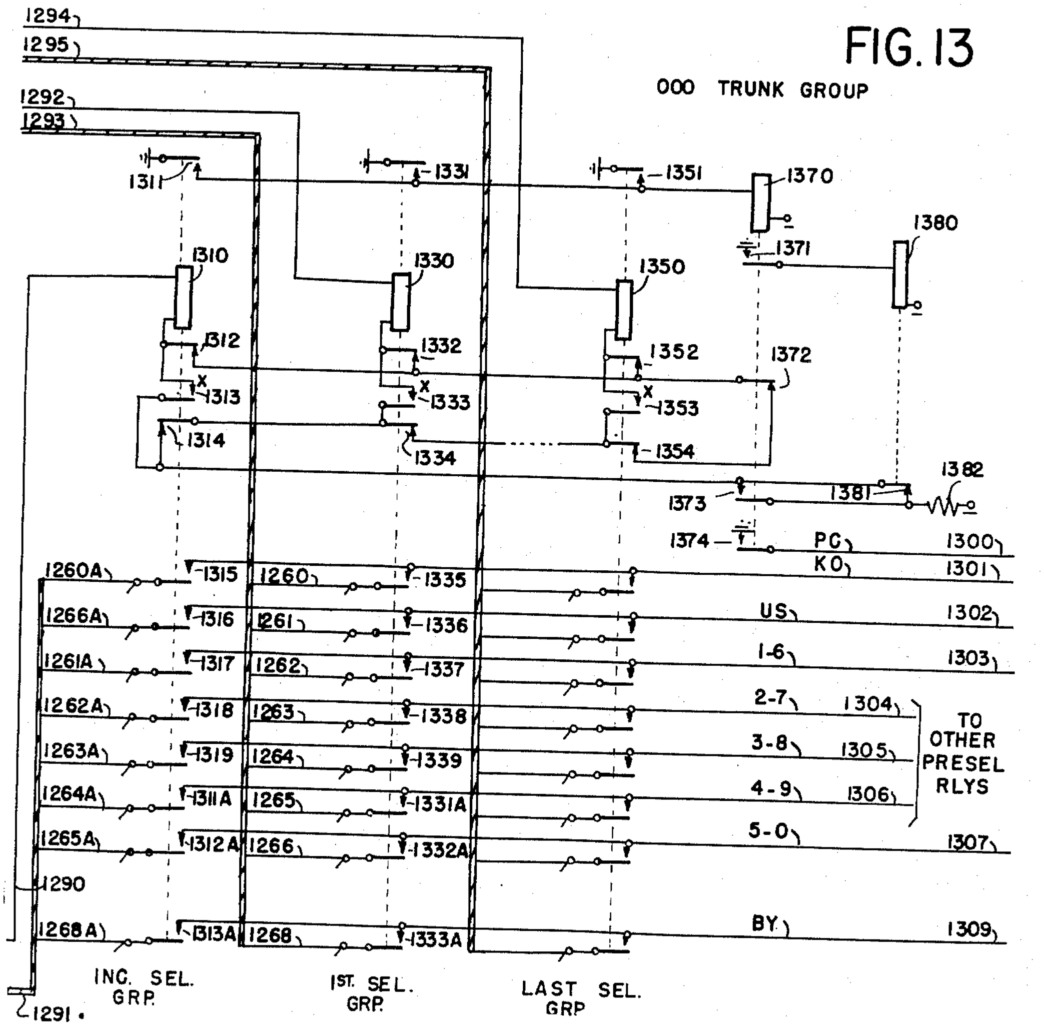

In Figure 13 are shown the "trunk group" relays for the heavy traffic group of trunks, which in this case, is the toll or "0" trunk group. In this unit, a "group" relay such as 1310, 1330 or 1350 is provided for each group of selectors, including the incoming selectors. These relays operate from the heavy traffic trunk access relays in response to the dialling of a first digit "0" in the case of the regular selectors, or in response to seizure only, in the case of the incoming selectors. Relay 1310 for example, is controlled from the heavy traffic trunk access relays 1205 associated with the incoming selector group, relay 1330 from the heavy traffic trunk access relays in the upper part of Figure 12 associated with the first regular selector group, and relay 1350 from the heavy traffic trunk access relays 1005 associated with the last regular selector group. These relays are also provided with a chin circuit to permit only one of them to be operated at a time, but again remain operated only for an instant. Relays 1370 and 1380 are "lockout" relays.

Figure 14:
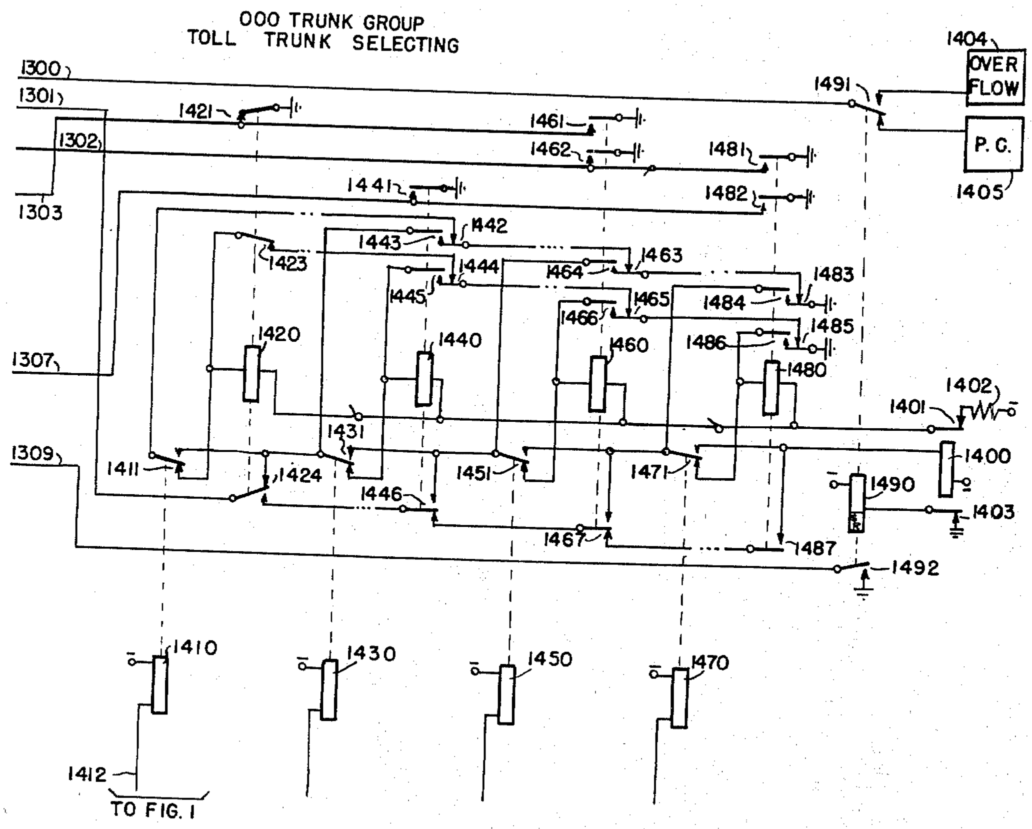

Figure 14 shows the "trunk selecting" relays for the toll trunk group. These relays are identical with those of Figure 11 except for the omission of the "trunk-call-marking" leads which are not required on calls to a toll operator. As in Figure 11 also, relays for trunks 1, 5, 6 and 0 only, are shown.

Figure 15:
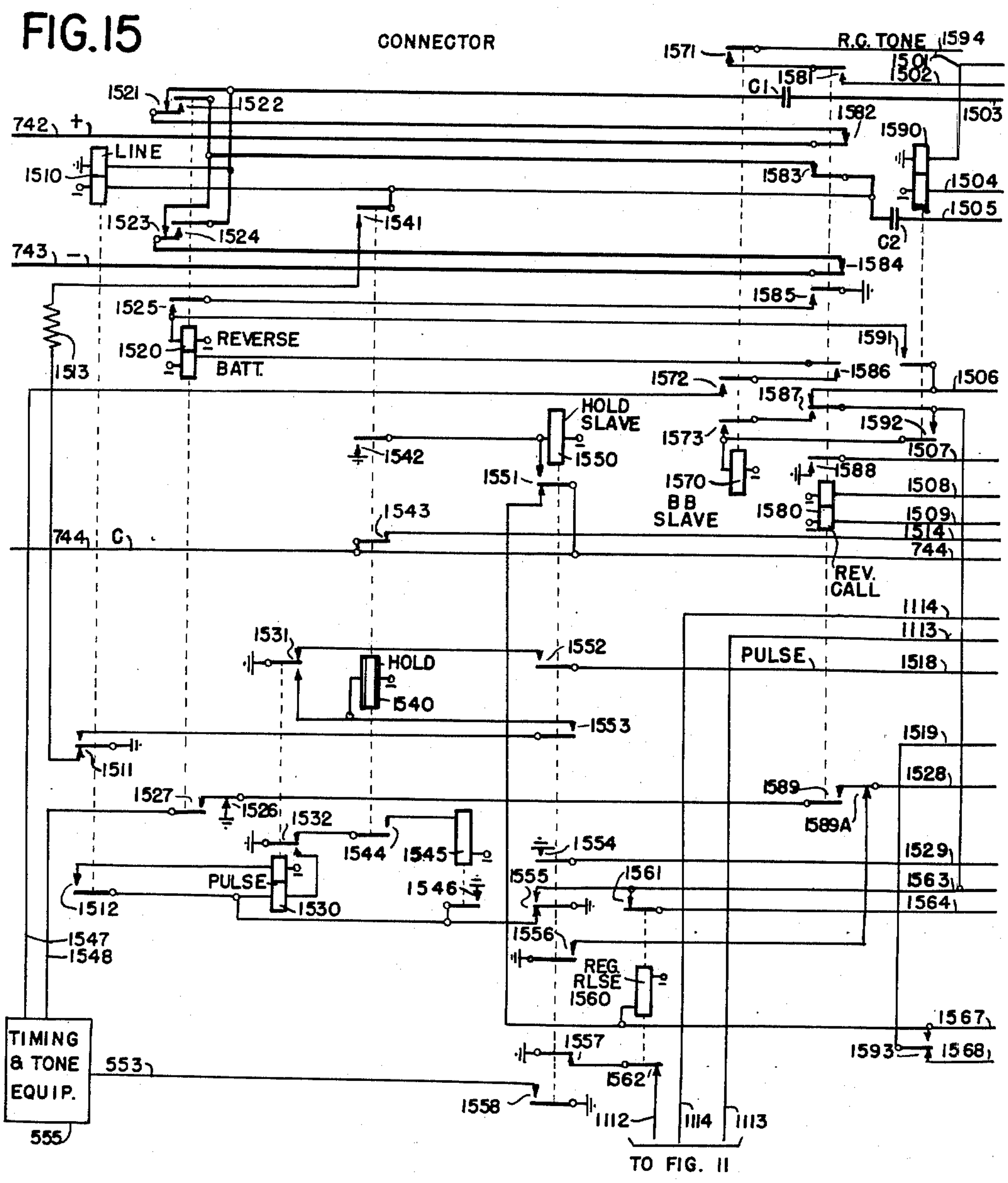

Figure 15 shows a portion of the miscellaneous control relays for one of the connector switches, namely, the connector which is accessible from the upper contacts of the selector tens relay 720 in Figure 7, the other connectors being of course identical except for their points of access. In Figure 15, relay 1510 is the "line" relay, relay 1520 is a "battery-reversing" relay, which is controlled from the back-bridge relay, 1530 is a "pulsing" relay controlled from the line relay, 1540 is a "hold" relay, 1545 is a "pulse-locking" relay, 1550 a "hold slave" relay, 1560 a "register release" or counting chain release relay, 1570 a "back-bridge slave" relay, 1580 a "reverting call"

relay, and 1590 is a "back bridge" relay. The timer is shown in the lower left corner by the rectangle 555 with two timing leads extending therefrom, a "release time pulse" lead 1547 and a "time cut off" lead 1548 which are utilized for reverting call timing. This is the same timer shown in Figure 5 which shows the timer leads associated with the timing of "permanents" or false seizures.

Figure 16:
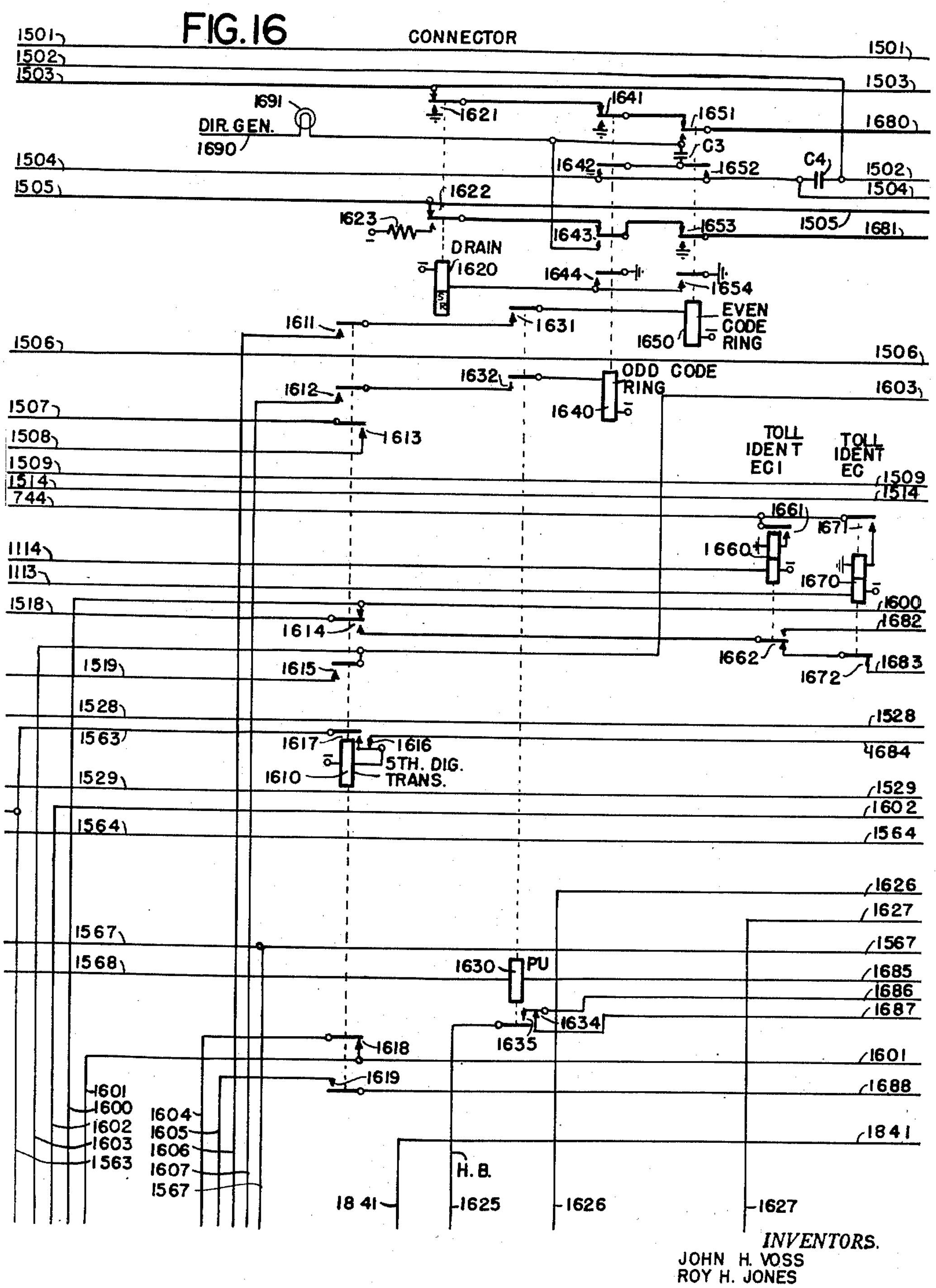

In Figure 16 are shown additional miscellaneous control relays for the connector. Relay 1610 is a "fifth-digit-transfer" relay which operates following the dialling of the last digit of the call number to prepare the ringing and cut-in-on-busy circuits. Relay 1620 is a "drain" relay which shunts the called line after each ringing signal, relay 1930 is a "pickup" relay which operates at the start of each ringing cycle to prepare the ringing circuits, and relays 1640 and 1650 are "ringing" relays, the first of which connects the ringing signals to the called line when an odd numbered ringing code is selected, and the second of which serves similarly when an even numbered code is selected, the odd numbered codes being applied to the negative side of the line and the even numbered codes to the positive side of the line. Relays 1660 and 1670 are "toll identification" relays, and are controlled from the finder and the finder control unit on calls from a toll operator, by way of the trunk selecting equipment, to further prepare the verification circuits.

Figure 17:
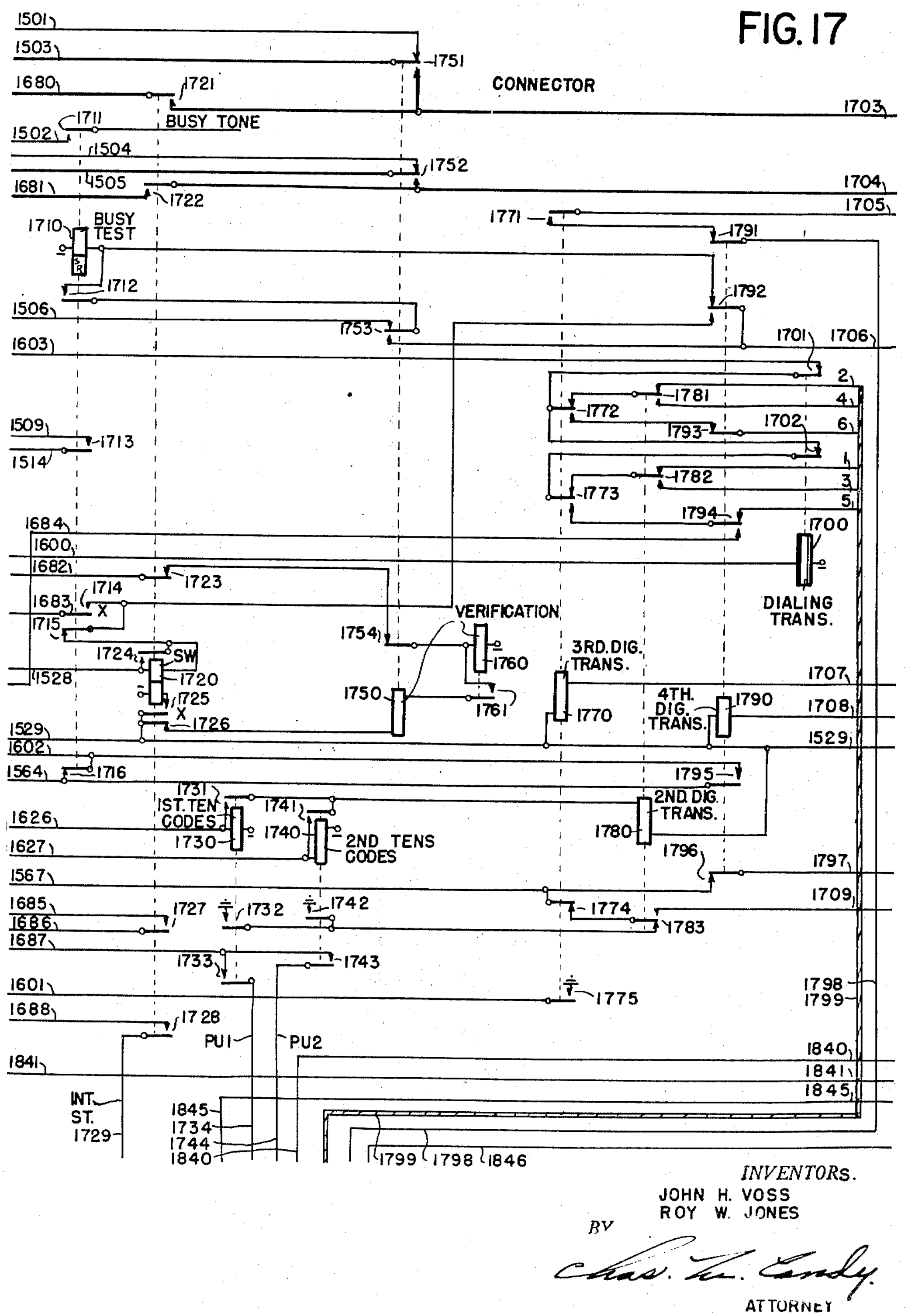

In Figure 17 are shown the balance of the miscellaneous control relays for the connector, relay 1710 being the "busy" relay, and relay 1720 the "switching" relay. Relays 1730 and 1740 are a pair of "code group selecting" relays, one or the other of which is operated from the counting relays of Figure 19, in response to the second digit of the call number, to select the first or the second ten ringing codes, and thus permit service to party lines having in excess of ten stations. Relays 1750 and 1760 are "verification" relays which may be operated by a toll operator upon dialling an extra digit, in order to cut in on a busy subscriber line; relays 1770, 1780 and 1790 are other "digit transfer" relays which operate in succession following the various digits of the subscriber call number dialled into the connector, to prepare the control circuits for the following digit; and relay 1700 is a "dialling transfer" relay which operates on each digit dialled into the connector, and releases after each digit, to complete the various connector control circuits.

Figure 18:
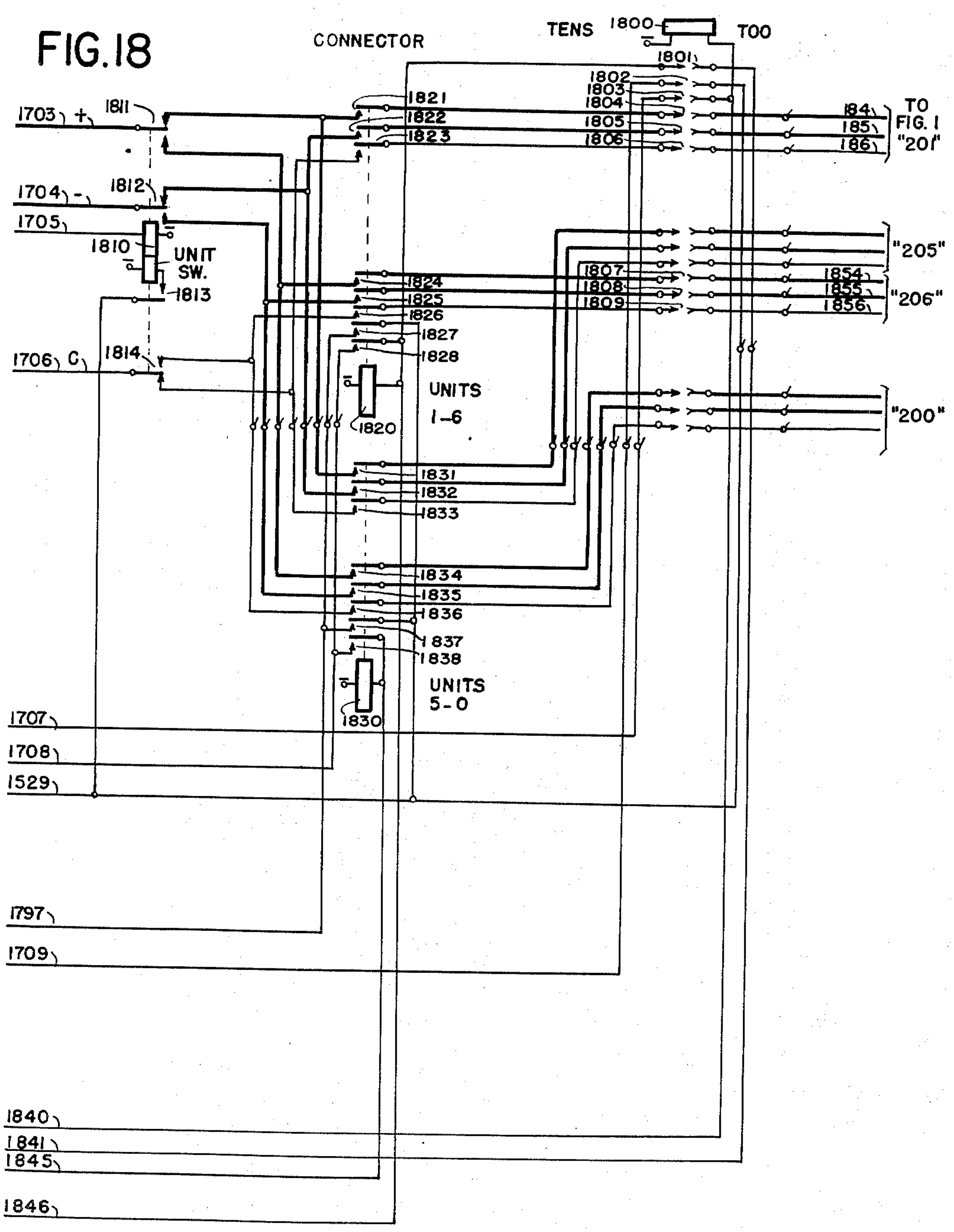
Figure 19:
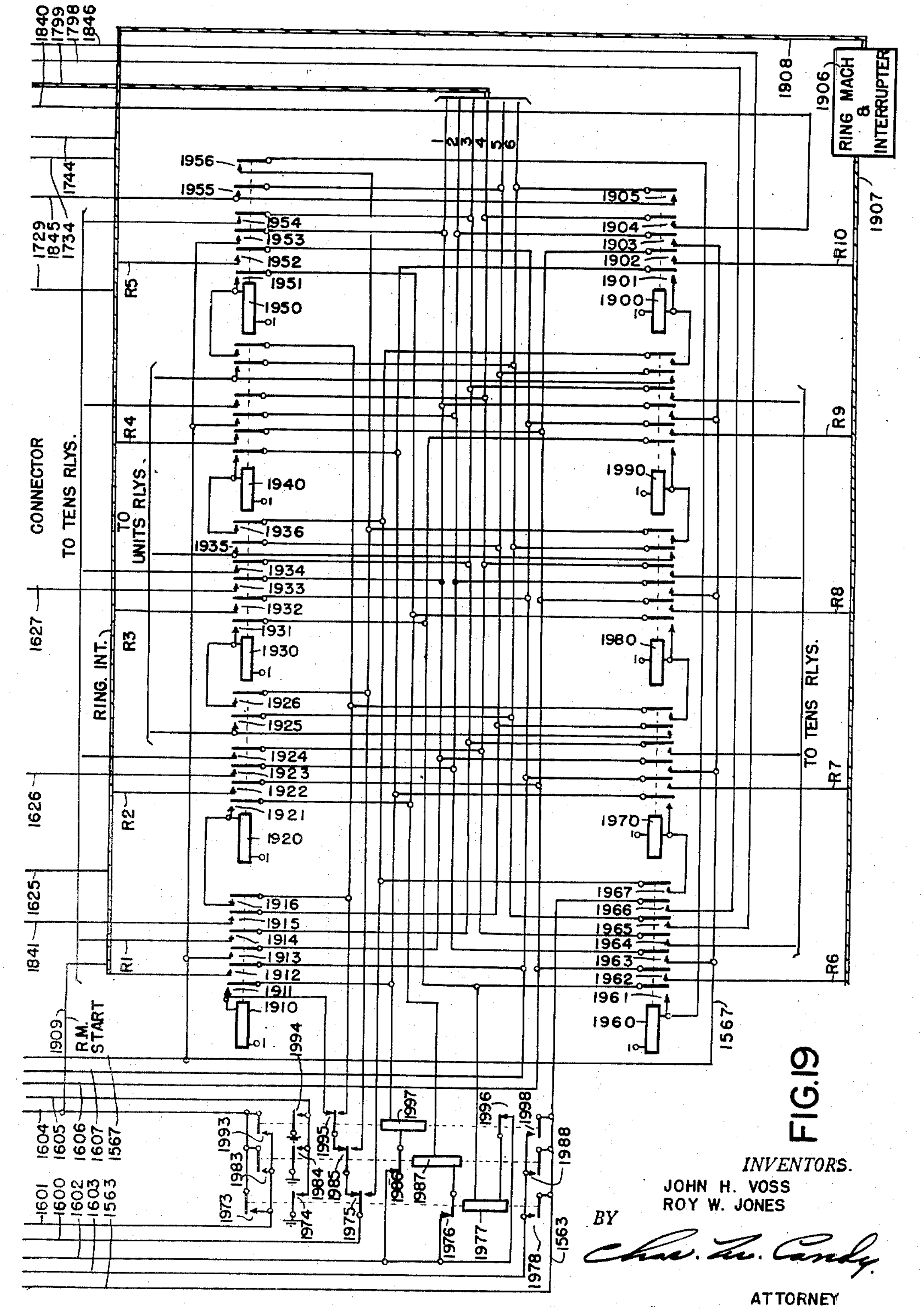
Figure 20:
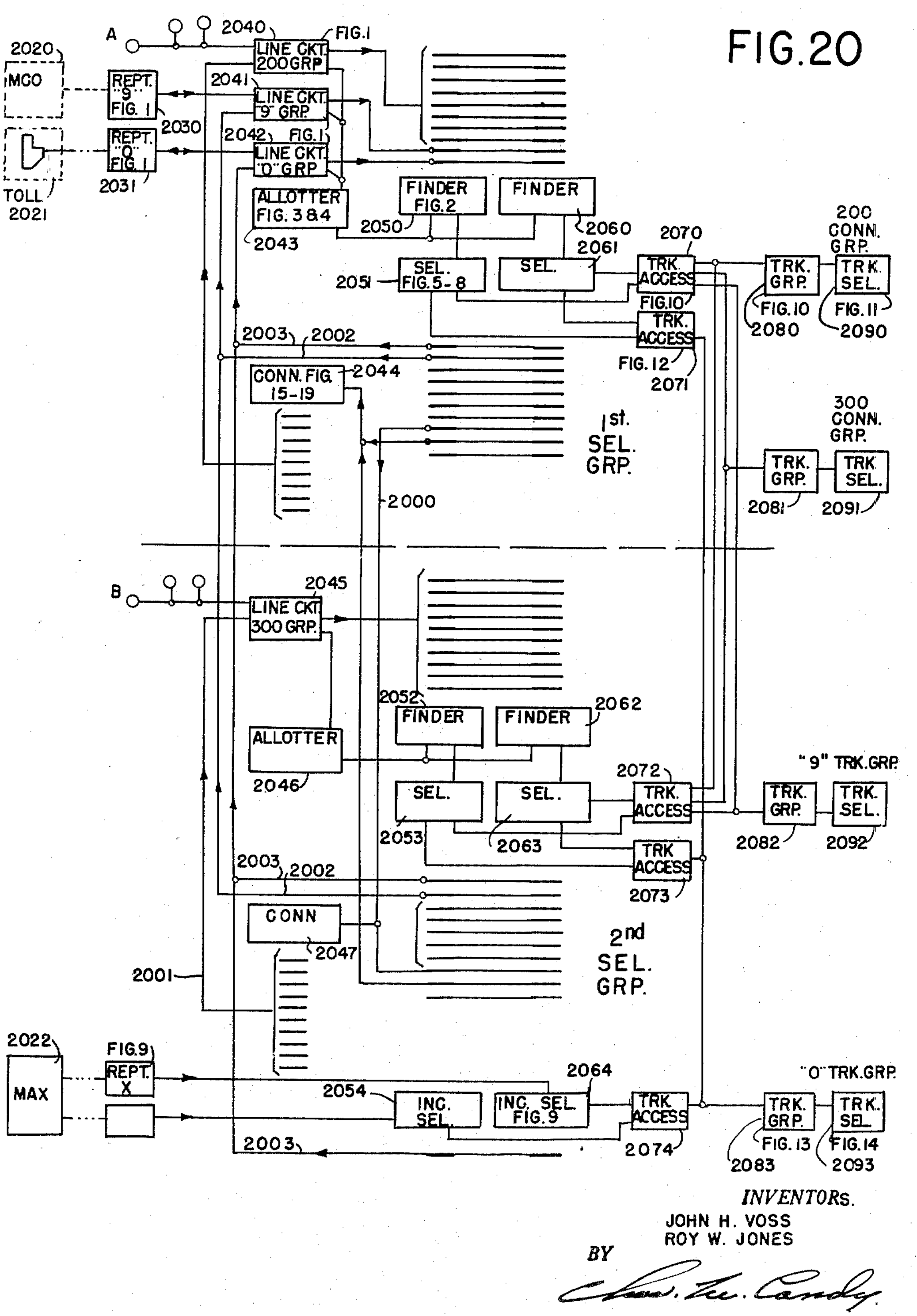

Figure 18 shows a portion of the connector tens and units relays, relay 1810 being the "units switching" relay, relays 1820 and 1830 being two of the units relays and relay 1800 being one of the tens relays, it being understood that these relays are similar to the corresponding relays of the selectors and that the tens and units relays not shown have the same functions and operate similarly, under control of the counting or register relays of Figure 19. This connector provides access to the subscriber lines of the "200" group, and one of the connections to such a subscriber line is indicated by the conductors 184, 185 and 186 shown connected to contacts of the tens relay 1800, whence they proceed to Figure 1, where they are shown terminating in the line circuit 201 in the line of the previously mentioned subscriber "A." Relay 1800 also provides access to nine other lines of the same tens group, of which connections for three are shown and the remaining six omitted in order to simplify the drawing. The other tens relays and three of the units relays are omitted for the same reason.

In Figure 19 are shown the "register" relays for the connector, comprising the ten round numbered counting relays 1910 to 1900 on the right of the sheet, and the three counting control relays 1977, 1987 and 1997 at the left. These relays operate in succession in response to the dial impulses as repeated by the pulsing relay 1530, to control the various selecting and ringing functions of the connector. A counting relay operates on the first half of each pulse, and on the second half of the pulse, a counting control relay operates in series therewith, and releases the previously operated pair of relays. At the end of each digit, the connector performs the switching operation called for by that digit and releases the register in preparation for the next digit. The ringing interrupter, indicated by the rectangle 1906 at the lower right, is arranged to provide twenty ringing codes divided into two groups of ten, the last ten differing from the first ten only by the addition of a short ring at the beginning of each code, in a well known manner, through the use of two "pick-up" or cycle starting conductors. The ringing generator is also assumed to be included in the rectangle 1906, conductor 1909 at the upper left being the start conductor for the ringing generator and conductor 1729 at the upper right being the start conductor for the interrupter. This interrupter, which is common to the system, is provided with ten interrupter leads R1 to R10, to which it applies different combinations of short or long ground pulses representing the ten fundamental ringing codes. The inclusion or omission of the preliminary short pulse is dependent on which pickup lead is made use of, on any given call.

The general description of the apparatus, and the basic method of operation having thus been completed, a detailed description of the circuit operation will now be given, in order to permit complete understanding of the invention.

*Call numbers*

Because of the use of 20-party lines in this system, five-digit call numbers are employed for calls to local subscribers. The first digit selects the hundreds group, at the selector, the second digit selects the first or second ten codes, at the connector, the third digit selects the tens group in which the wanted line is located, the fourth digit selects the called line, and the fifth digit selects the ringing code of the wanted subscribers station, odd numbered codes being arbitrarily applied to the negative line and even numbered codes to the positive line. Trunk calls use single call numbers, as previously indicated, and do not affect the connectors.

In the selector, a first digit "1" is absorbed, a first digit "9" selects a trunk to the manual office, a first digit "0" selects a trunk to the toll office, and all other first digits select a trunk to a local connector.

In the connector, a second digit "2" selects the first ten ringing codes, a second digit "3" selects the second ten ringing codes, and all other second digits are absorbed. The last three digits may be any digit from "1" to "0," and serve to operate the connector tens and units and ringing relays as indicated.

*Subscriber to subscriber call*

Let it be assumed that subscriber A on the line

"201" in Figure 1 wishes to call a subscriber on line "206" having the call number "22062," representing the line "206," the first code group, and the second code thereof.

When subscriber A removes the receiver or handset from his telephone to initiate the call, the resulting short circuit of the line causes the immediate operation of line relay 170 in the subscriber's line circuit by way of the line conductors 174 and 175, and break contacts 191 and 192. Relay 170 upon operating, at make contacts 172 connects ground to the "CN" conductor 186 to mark this line busy at the corresponding contacts of the connector tens relays, and at contacts 171 and 173 connects ground to the marking conductors 197 and 198 leading to the tens and units marking relays of Figure 3. The ground on conductor 198 causes the immediate operation of the "tens marking" relay 330, the complete circuit for this relay being from ground at make contacts 171, through break contacts 181, conductor 198, relay 330, break contacts 332, 381, 334, 324, similar break contacts on the other tens marking relays, not shown, break contacts 314, and the resistor 327 to negative battery.

The "00" tens marking relay 330 upon operating, at its "close first" make contacts 333 locks up to the battery at resistor 327 independently of contacts 332 and 381, at its break contacts 332 opens its own pull-up circuit, and at break contacts 334 opens the pull up circuit of the other tens marking relays, in order to prevent the operation of any other of these relays in response to another call from this group of lines until the present call has been extended to an idle finder. Relay 330 also prepares the operate circuits for the units marking relays, and specifically, at make contacts 335 completes a circuit for the operation of the first units marking relay 340, the complete circuit being from ground at break contacts 182, through make contacts 173, conductor 197, make contacts 335, relay 340, break contacts 342, 382, 374, 364, 354, 344 and similar contacts on the other units marking relays not shown, to battery through the resistor 347. Finally, relay 330 at make contacts 331 prepares a circuit for the corresponding finder tens relay.

Units marking relay 340 upon operating over the previously traced circuit, at its "close first" make contacts 343 locks to battery at resistor 347 independently of break contacts 382, at break contacts 342 opens its own pull up circuit, and at break contacts 344 opens the pull-up circuit of the other units marking relays to prevent their operation. Relay 340 also, at make contacts 345 prepares a circuit for the corresponding finder units relay, and at make contacts 341 completes an operate circuit for the connect relays 250 and 260 of the preselected idle finder, in this case the first finder, shown in Figure 2, by way of the start conductor 357, make contacts 471 of the operated first link select relay 470, conductor 279, and the windings of the connect relays 250 and 260 in parallel. The opening of break contacts 342 and 344 also opens the circuit of the normally operated blocked call relay 420 momentarily, but this relay, being made slow to release, remains operated for an instant. The closing of make contacts 346 is without effect at this time.

Connect relay 250 operating over the previously traced circuit prepares the operate circuits of the finder tens relays, and at make contacts 253 completes the circuit of the "00" tens relay 200, from the ground at make contacts 331, by way of conductor 300, cable 399, and make contacts 253. Connect relay 260 upon operating prepares the operate circuits of the finder units relays, and at make contacts 262 completes the circuit of the 1–6 units relay 220, from the ground at make contacts 345, by way of conductor 391, cable 397, and make contacts 262. Relay 260 also, at make contacts 266 connects ground to conductor 390 and hence to guard relay 380 by way of cable 397, whereupon this relay operates and at break contacts 381 and 382 further opens the pull-up circuits of the tens and units marking relays, preparatory to the release of the control unit. Finally relay 260 at make contacts 269 places a holding shunt across the link select relay 470 to prevent the premature release of this relay, and at make contacts 261 places a shunt across the talking conductors 273 and 274 leading to the associated selector, thereby causing the operation of the selector line relay 520 and the seizure of the selector.

The operation of the selector line relay is from ground on the dial tone lead 524, through break contacts 571, the upper winding of relay 520, break contacts 511, conductor 273, make contacts 261, resistor 246, conductor 274, break contacts 512, and the lower winding of relay 520 to negative battery. Relay 520, at make contacts 521 causes the operation of pulsing relay 530 from ground at back contacts 561, and at make contacts 522 prepares an alternative circuit for the hold relay 540. Relay 530 at make contacts 531 closes a locking circuit for itself through resistor 523, and at make contacts 532 causes the operation of hold relay 540 from ground at break contacts 591, by way of break contacts 513. Hold relay 540, at make contacts 541 grounds the test conductor 275, at make contacts 542 prepares the operate circuit of the pulse control relay 550, at make contacts 543 causes the direct operation of the hold slave relay 560, and at make contacts 544 prepares a priming circuit for line relay 520. Hold slave relay 560 upon operating, at make contacts 561 grounds the hold conductor 276, at make contacts 562 grounds the timer start conductor 553, and at make contacts 563 completes the alternative circuit for the hold relay 540 from ground at back contacts 591, by way of back contacts 513, and make contacts 522. Relay 560 also, at make contacts 564 prepares the pulsing circuit to the register relays, at make contacts 565 prepares a circuit for the time release relay 590, and at break contacts 566 prepares the release of link select relay 470, now held at contacts 269 of the connect relay 260.

In the finder, the operation of the tens and units relays 200 and 220, which occurs at the same time as the operation of the selector line relay, extends the talking and test conductors 273, 274 and 275 through to the calling line, thereby completing a holding circuit for the selector line relay independent of make contacts 261, by way of break contacts 241 and 242, make contacts 221 and 222, make contacts 202 and 203, line conductors 174 and 175 and the calling telephone. Now when the selector hold and hold slave relays return ground on the test and hold conductors 275 and 276 as explained in the preceding paragraph, the ground on the hold conductor 276 locks up the operated tens and units relays 200 and 220, through their make contacts 201 and 227 respectively, while the ground on the test conductor 275 passes through break contacts 243, make contacts 223 and 204, test conductor 176, and the windings of the line circuit cutoff and lockout relays 190 and 180 in series to negative battery, and causes the operation of these relays.

Cutoff relay 190 upon operating, opens the circuit of the line relay 170 which restores and reverses its contacts 172. This removes the original ground from the test normal conductor 186 and replaces it with the ground now on the test conductor 176. Lockout relay 190 upon operating, opens break contacts 181 and 182, and thereby disconnects ground from conductors 197 and 198, thus causing the immediate release of the operated tens and units marking relays 330 and 340.

Tens marking relay 330 upon releasing, disconnects the units marking relays, opens its locking circuit and re-prepares its pull-up circuit, and at make contacts 331 disconnects operate ground from conductor 300 and the finder tens relay 200. Relay 200 is now locked to hold conductor 276 however, and remains operated. Units relay 340 on releasing, likewise opens its locking circuit and re-prepares its pull-up circuit. The closing of break contacts 342 and 344 also re-establishes the circuit of the blocked call relay 420, which, under normal conditions, occurs before this relay has had time to release its armature. Relay 340 also, at make contacts 341 opens the circuit of the connect relays 250 and 260 which restore, and at make contacts 345 opens the operate circuit of the finder units relay 220. Relay 220 however, is also now locked to the hold conductor 276 and remains operated.

Connect relays 250 and 260 upon releasing, further open the operate circuits of the finder tens and units relays. Relay 260, at make contacts 261 clears resistor 246 from the line circuit; at make contacts 266 opens the circuit of the guard relay 380 which restores, after a slight delay; and at make contacts 269 opens the circuit of the link select relay 470 which restores immediately.

Link select relay 470 upon releasing, at contacts 471 disconnects the finder start lead 357 from the first finder and extends it to the second finder, not shown, assuming this finder to be idle at this time; at break contacts 472 extends an incomplete "shunt-down" circuit from break contacts 441 to the second link select relay, not shown; at contacts 473 opens its locking circuit and prepares its pull-up circuit; and at break contacts 474 closes a point in the circuit of the reset relay 450. Guard relay 380, upon releasing, closes break contacts 381 and 382 to restore the pull-up circuits of the tens and units marking relays. The control unit is now free for another call from this group, which will be handled by the second link. Guard relay 380 is made slow to release to make sure that the tens and units marking relays will have fully restored, before they can be seized again by another call.

If for any reason a calling line is not switched through promptly, so that the tens and units marking relays of the control unit remain operated beyond the release time of the slow-to-release blocked call relay 420, this relay will restore and at make contacts 421 will open the circuit of relay 430. This relay is also made slow to release however, and will remain operated for an additional short interval of time. When it does release, it causes the operation of slow release relay 440 from ground at break contacts 462, by way of break contacts 414 and 432. Relay 440 at break contacts 441 opens the previously mentioned incomplete "shunt down" circuit to the link select relays, and at make contacts 442 closes a direct circuit to slow to release relay 410 which operates. Relay 410 upon operating, at make contacts 412 prepares the shunt-down circuit, at make contacts 413 causes the re-operation of relay 420 from battery at the resistor 327 by way of conductor 348, and at break contacts 414 opens the circuit of relay 440 which restores after a slight delay, and in turn opens the circuit of relay 410 which likewise restores, after a further slight delay. During the interval between the release of relays 440 and 410 however, the shunt down circuit is completed momentarily from battery through the low resistance 411, make contacts 412, break contacts 441, make contacts of the first operated link select relay, conductors corresponding to conductors 277 and 278, and the winding of the stated link select relay to negative battery. This causes the release of this relay and passes the call to the next idle link. When relay 410 releases, it opens the shunt-down circuit, restores the original circuit of relay 420, and again prepares the circuit of relay 440 now open at break contacts 432 due to the reoperation of relay 430 from make contacts 421.

When the last link is taken into use, the seizure of the last selector will cause the release of the last link select relay 480. The closing of break contacts 484 will thereupon complete a circuit for reset relay 450 through corresponding break contacts on the other link select relays. Reset relay 450 thereupon operates and at make contacts 451 grounds the reset circuit. This causes the re-operation of all of the link select relays whose links are again idle, over multiple paths corresponding to back contacts 473, conductor 277, break contacts 517 and 566, conductor 278 and the winding of the associated link select relay to battery. The re-operation of any link select relay will open the circuit of the slow to release reset relay, and this relay after a slight delay will restore and open the reset circuit. If no link is free at this time however, the link select relays will remain de-energized, and the reset relay will remain operated.

Should another call be initiated in this group of lines with all links thus busy, ground from the units marking relays on the start conductor 357 will cause the operation of the overflow relay 460, by way of back contacts of the link select relays such as 471 and 481, in series. Relay 460, at make contacts 463 locks to ground at make contacts 452, and at make contacts 464 extends operating ground to an overflow meter, not shown, by way of make contacts 433 and conductor 434. Relay 460 also at break contacts 461 removes one of the grounds for the blocked call relay 420, and at break contacts 462 opens a point in the circuit of blocked call relay 440. Should all links remain busy beyond the release time of relay 420, this relay and relay 430 will restore in sequence as previously explained, and relay 430 at make contacts 431 removes the second ground from relay 420 to prevent its reoperation for the moment should the call be abandoned; at break contacts 432 prepares the circuit of relay 440; and at make contacts 433 opens the meter circuit.

Should a link now become free, the associated link select relay will re-operate immediately and open the operate circuits of the reset and overflow relays. The reset relay 450 thereupon releases, after a short delay, and opens the locking circuit of overflow relay 460, which then also releases. Relay 460, at break contacts 461 re-connects ground to relay 420, at make contacts 463 further opens its locking circuit, and at make contacts 464 further opens the meter circuit. Relay 460 also, at break contacts 462 completes the circuit of relay 440 which operates, and causes relay 410 to also operate. Relay 410 at make contacts 413 causes the reoperation of relays 420 and 430 as previously explained, followed by the sequential release of relays 440 and 410. The release of these latter two relays will again close the shunt down circuit momentarily, but as the call will have been switched through already, this is without effect.

The extension of the selector line relay circuit to the calling line by the finder, and the removal of the shunt across conductors 273 and 274 by the opening of make contacts 261, permits dial tone from the dial tone conductor 524 to pass back over the calling line, where it is made audible in the receiver of the calling telephone in the well known manner. The tone circuit is from the grounded dial tone lead 524, through back contacts 571, the upper winding of the line relay 520, break contacts 511, conductor 273, break contacts 241, make contacts 221 and 202, line conductor 174, telephone, "A," conductor 175, make contacts 203 and 222, break contacts 242, conductor 274, break contacts 512, and the lower winding of relay 520 to negative battery and through the battery back to ground.

The calling party upon hearing the dial tone, now dials the first or "hundreds" digit "2" of the call number "22062," thereby causing the selector line relay 520 to release and re-operate twice. Upon the first release of relay 520, the opening of make contacts 521 causes pulsing relay 530 to also release, while break contacts 522 close the priming circuit of the line relay, from ground at back contacts 591, through back contacts 513, back contacts 522, make contacts 544, resistor 519, and the lower winding of relay 520 to battery. Relay 520 will not re-operate over this circuit, but is made ready to re-operate quickly. Pulsing relay 530 upon releasing, at back contacts 531 causes the operation of pulse control relay 550 which at make contacts 551 prepares the re-operation of relay 530. Relay 530 also, at make contacts 532 momentarily opens the circuit of the hold relay 540, and at break contacts 532 completes the pulsing circuit to the register relays. When the line relay 520 re-operates during the second half of the dial pulse, make contacts 521 again cause pulsing relay 530 to operate from ground at make contacts 551. Relay 530 locks as before to its own make springs, and releases relay 550. Relay 530 also, at make contacts 532 restores the circuit of hold relay 540 now also closed through make contacts 522 and 563, and at break contacts 532 opens the pulsing circuit. This same cycle of operation is repeated for each pulse.

Each release of pulsing relay 530, as previously stated, closes a pulsing circuit to the register relays of the selector. This circuit is from ground at back contacts 591, through back contacts 513 and 532, make contacts 564, break contacts 573, conductor 509, and the windings of transfer relay 819 and one of the counting relays in parallel. The first pulse for example, operates relay 819 and the first counting relay 810, over break contacts 836, 837 and 838. Transfer relay 819, which being made slow to release remains operated during the pulsing, at break contacts 829 and 849 disables the operate circuits to the springs of the register relays, and at make contacts 839 prepares a circuit for the operation of counting control relay 818. Counting relay 810 at make contacts 814 prepares an operate circuit for the second counting relay, and at make contacts 811 extends its own operating ground to relay 818. Relay 818 also has ground on the other side of its winding from the hold conductor, by way of break contacts 514 and 574, conductor 509, and break contacts 847, and does nothing. On the second half of the pulse however, when the pulsing circuit is opened, the shunt is removed from relay 818, and this relay operates, in series with relay 810, and transfers the pulsing circuit to relay 820. At the start of the second pulse, counting relay 820 operates by way of break contacts 836 and 837 and make contacts 838 and 814. Relay 820 in turn, at make contacts 824 prepares the operate circuit of the third counting relay, and at make contacts 821 extends its own circuit to the second counting control relay 817 which now has ground on both sides of its winding and therefore remains normal. On the second half of the pulse however, when the operate circuit of relay 820 is opened, relay 817 operates, in series therewith. Relay 817, at make contacts 837 prepares a circuit for the third counting relay 830 and at break contacts 847 opens the locking circuit of relays 818 and 810, which restore.

Shortly after the completion of the second and last impulse of the first digit, transfer relay 819 restores, and at make contacts 839 further opens the locking circuit of counting relay 810. Relay 819 also, at break contacts 829 completes parallel circuits for the operation of the selector tens relay 720 and the trunk access relay 1010 associated with this selector, from ground on the hold conductor through break contacts 514, conductor 508, and contacts 829 and 827. The circuit for tens relay 720 then passes through make contacts 822, conductor 725, and the winding of relay 720 to battery, while the circuit for relay 1010 passes through make contacts 823, conductor 868, cable 658, conductor 868 in Fig. 10, winding of relay 1010, break contacts 1012 and 1032, make contacts 1051, break contacts 1024 and 1014 and similar contacts on the intervening "access" relays not shown, break contacts 1041 and the resistor 1034 to battery.

Tens relay 720 upon operating, connects the now open springs of the units relays through to the ten trunks leading to the "200" group of connectors, and at make contacts 721 locks to ground on the hold conductor 276, by way of conductor 713 and resistor 616.

Access relay 1010 upon operating closes its "make-first" contacts 1013 and thereby locks direct to negative battery through break contacts 1041 and resistor 1034. Relay 1010 also at its lower make contacts extends the units-marking and miscellaneous control leads from the selector to the springs of the group relay 1060 and the corresponding group relays also associated with this selector group in the other regular groups of trunk group relays, such as indicated by the rectangles 1006 and 1008. Relay 1010 also, at break contacts 1012 opens its own pull-up circuit, and at break contacts 1014 opens the pull-up circuit of all of the other access relays of the group such as 1020, as well as the locking circuit of the access relays succeeding it in the chain, thereby assuring the operation of only a single one of these relays at a time. Relay 1010 further, at make contacts 1015 closes an obvious circuit to lockout relay 1030 which operates. Relay 1030, at make contacts 1033 shunts break contacts 1041 to maintain the locking circuit to relay 1010, at break contacts 1032 further opens the pull-up circuit, and at break-make contacts 1031 opens the circuit of the kickoff relay 1050 and closes a circuit to lockout relay 1040. Relay 1050, being made slow to release remains operated under normal conditions, as its circuit is opened only momentarily. Relay 1040 operates and opens break contacts 1041, but without effect at the moment. Relay 1010 finally, at make contacts 1011 causes the operation of group relay 1060 over the following circuit: ground, contacts 1011, conductor 869, cable 658, conductor 869 in Fig. 8, break contacts 849, make contacts 825, conductor 866, relay 1060, break contacts 1062 and 1082, break contacts 1074 and 1064 and similar break contacts of the intervening group relays not shown, break contacts 1091 and the resistor 1092 to battery.

Group relay 1060 upon operating, at preliminary make contacts 1063 locks to battery through break contacts 1091 and resistor 1092, at break contacts 1062 opens its own operate circuit, at break contacts 1064 opens the operate and locking circuits of the other group relays, and at its lower make contacts extends the "units-marking" leads and the "trunk-call-marking" and "all-trunk-busy" leads through to the trunk selecting relays of Fig. 11. Relay 1060 also, at make contacts 1061 closes a circuit to lockout relay 1080 which operates. Relay 1080, at make contacts 1084 closes a circuit to the peg count register 1105 by way of conductor 1126 and make contacts 1191; at make contacts 1083 shunts break contacts 1091 preparatory to the operation of lockout relay 1090; at break contacts 1082 further opens the operate circuit of the "group" relays; and at make contacts 1081 causes relay 1090 to operate. Relay 1090 upon operation opens its break contacts 1091 but this is without effect at this time due to the closed make contacts 1083.

Immediately upon the extension of the units marking leads to the trunk selecting relays, following the operation of group relay 1060, assuming all connectors in the group idle and preselect relay 1120 operated as shown, ground from make contacts 1121 is passed back to the selector to operate the 1–6 units relay 620 by way of the 1–6 units-marking conductor 1129, make contacts 1067 and 1017, conductor 651, cable 658, conductor 651 in Fig. 6, and the winding of relay 620 to battery.

Units relay 620 upon operating over this circuit, extends the selector talking and test conductors 501, 502 and 275 to Fig. 15, by way of break contacts 611, 612 and 613, make contacts 621, 622 and 623, conductors 712, 711 and 710, make contacts 722, 723 and 724, and the connector talking and test conductors 742, 743 and 744. Relay 620 also, at contacts 628 locks to ground on the hold conductor 276 by way of resistor 615, and at make contacts 627 completes a circuit for the switching relay 510 which operates. This circuit is from ground at make contacts 541, over test conductor 275 right, conductor 617, make contacts 627, conductor 507, break contacts 576 and 516, and the winding of relay 510 to battery.

Ground on test conductor 275 also at this time causes the operation of the register release relay 1560 in the connector over the following circuit: make contacts 541, conductor 275, break contacts 613, make contacts 623, conductor 710, make contacts 724, test conductor 744, break contacts 1551, and the winding of relay 1560 to battery. Relay 1560 upon operating, opens break contacts 1561 but without effect, and at break contacts 1562 removes ground from conductor 1112 leading to the trunk selecting equipment, thereby causing the release of trunk busy relay 1110 in Fig. 11.

Trunk busy relay 1110 upon releasing, at make contacts 1111 opens the operate circuit of preselect relay 1120, now locked through its make contacts 1122 to ground at contacts 1185 on the last preselect relay 1180. Relay 1110 also, at break contacts 1111 completes an operate circuit for the second preselect relay not shown, from ground at contacts 1183, through contacts 1164 and 1142 and similar contacts on the preselect relays not shown, break contacts 1111, make contacts corresponding to make contacts 1131 on the second trunk busy relay, not shown, winding of the second preselect relay, not shown, break contacts 1101 and resistor 1102 to battery. The second preselect relay operates over this circuit, at contacts not shown corresponding to contacts 1141 grounds the now open 2–7 units marking conductor 1137; at contacts corresponding to contacts 1145 closes a locking circuit for itself from ground at contacts 1185; and at contacts corresponding to contacts 1144 opens the locking circuit of preselect relay 1120, which restores. On succeeding calls to this trunk group, the other preselect relays operate similarly, one after the other, until the last trunk is taken into use. When this happens, trunk busy relay 1170 restores and causes reset relay 1100 to operate from ground through make contacts 1184. Relay 1100, at break contacts 1101 unlocks relay 1180 which restores and releases relay 1100. Relay 1180 also, at break contacts 1183 again closes the operate circuit of relay 1120 which re-operates, if the associated trunk is now free, and the cycle repeats. If the first trunk is still busy, the preselect relay associated with the first idle trunk will re-operate.

The selector switching relay 510 upon operating, at break contacts 517 further opens the circuit of link select relay 470, at break contacts 516 opens the shunk around resistor 518 to facilitate the release, at break contacts 515 opens the operate circuit of the busy relay, and at break contacts 514 removes hold conductor ground from conductors 508 and 509 leading to the counting relays. The removal of ground from conductor 509 opens the locking circuit to the counting relays, and relays 817 and 823 immediately release. The removal of ground from conductor 508 opens the operate circuits of tens relay 720 and access relay 1010. Relay 720 remains locked but relay 1010 releases immediately, at contacts 1011 and 1015 opens the circuit of relays 1030 and 1060 which also release; and at contacts 1017 opens the operate circuit of the units relay 620, which however is now locked operated. Relay 1030 in turn causes the release of lockout relay 1040 and re-closes the circuit of relay 1050 before this relay has had time to release. The release of relay 1060 likewise causes the successive release of lockout relays 1080 and 1090. The regular trunk access and trunk group relays for the first group of selectors are now again normal, and ready for the next call from this selector group, access relay 1010 being restored before the next preselect relay operates.

Switching relay 510 also, at break contacts 511 and 512 disconnects the selector line relay 520 and dial tone from the calling line, and relay 520 immediately restores and causes the pulsing and pulse control relays 530 and 550 to also restore. At make contacts 511 and 512, relay 510 completes a circuit for the operation of the connector line relay 1510, this circuit being from ground through the upper winding of relay 1510, break contacts 1521 and 1582, conductor 742, make contacts 722, conductor 712, make contacts 621, break contacts 611, conductor 501, make contacts 511, conductor 273, break contacts 241, make contacts 221 and 202, line conductor 174 and the calling telephone, line conductor 175, make contacts 203 and 222, break contacts 242, conductor 274, make contacts 512, conductor 502, break contacts 612, make contacts 622, conductor 711, make contacts 723, conductor 743, break contacts 1584, 1523 and 1583, and the lower winding of relay 1510 to battery.

Finally, switching relay 510, at make contacts 513 connects ground from make contacts 591 to the hold conductor 276 preparatory to the release of the hold and hold slave relays, and at break contacts 513 opens the circuit of hold relay 540. Hold relay 540 thereupon restores after a slight delay, at make contacts 541 removes local ground from the test conductor 275, which is now grounded from the connector in a manner to be described in the next paragraph; and at make contacts 543 opens the circuit of the hold slave relay 560. Relay 560 now also restores, and at contacts 561 removes its ground from the hold conductor, now grounded from break contacts 591 as previously stated. Relay 560 also, at contacts 562 removes selector ground from the timer start lead, at contacts 563 opens another point in the circuit of the hold relay, at contacts 564 opens a point in the pulsing circuit, now open at break contacts 513, and at make contacts 565 opens the operate circuit of the "permanent" time release relay 590.

Connector line relay 1510 upon operating, at make contacts 1512 closes a circuit for the operation of pulsing relay 1530 from ground at back contacts 1555, and at make contacts 1511 prepares an alternative circuit for the hold relay 1540. Pulsing relay 1530 upon operating, at make contacts 1531 closes an obvious circuit for the operation of hold relay 1540, and at make contacts 1532 prepares a locking circuit for itself. Hold relay 1540 upon operating, at contacts 1541 prepares a priming circuit for the line relay, at contacts 1542 closes an obvious circuit for the operation of the hold slave relay 1550, at contacts 1543 opens a point in the operate circuit of the reverting call relay 1580, and at contacts 1544 prepares a circuit to the pulse control relay 1545. Hold slave relay 1550 upon operating, at make contacts 1551 connects ground from contacts 1542 to the test conductor 744 just prior to the removal of the selector ground from this conductor; at break contacts 1551 opens the circuit of the register release relay 1560 which restores; at make contacts 1552 prepares the connector pulsing circuit; at make contacts 1553 completes the previously mentioned alternative circuit for the hold relay; and at contacts 1554 connects locking ground for the connector tens and units relays to conductor 1529. Relay 1550 also, at make contacts 1555 grounds conductor 1563, at break contacts 1555 removes shunting ground from the lower winding of the operated pulsing relay 1530 thereby making the locking circuit of that relay effective, at make contacts 1556 prepares the operating circuit of the switching relay 1720, at break contacts 1557 opens another point in the circuit of trunk busy relay 1110 preparatory to the restoration of register release relay 1560, just described, and at make contacts 1558 grounds conductor 553 to maintain the operation of the timing and tone apparatus.

The foregoing seizure of the connector being easily completed during the interdigital pause, the dialing of the second or "code group" digit "2" of the call number "22062" now causes the connector line relay 1510 to release and re-operate twice. At each release of relay 1510, make contacts 1512 open the circuit of pulsing relay 1530 which also releases, while make contacts 1511 momentarily open one of the circuits to the hold relay 1540, and break contacts 1511 close a priming circuit to the line relay, through resistor 1513 and make contacts 1541. The current in this circuit is not sufficient to operate the line relay, but does assist it to re-operate quickly during the second half of each pulse. At each release of pulsing relay 1530, break contacts 1531 close the pulsing circuit and make contacts 1531 momentarily open the other side of the circuit to the hold relay which however remains operated, due to being made slow to release. Relay 1530 also at each release, at break contacts 1532 closes a circuit to pulse control relay 1545 which operates and prepares the re-operation of relay 1530.

On each closure of the pulsing circuit, ground from break contacts 1531 passes through make contacts 1552 and break contacts 1914, and thence left over conductor 1600 to the counting relays of Fig. 19. A portion of this circuit also extends right on conductor 1600 to the slow to release dialing transfer relay 1700 which operates on the first pulse, and releases shortly after the last pulse of the digit to prepare the operate circuits from the springs of the counting relays. On the first grounding of the pulse conductor 1600, counting relay 1910 operates, and on the break of the pulse counting control relay 1997 operates in series therewith, thereby locking both relays operated in series over the following circuit: ground from make contacts 1555, through break contacts 1561, conductor 1564, break contacts 1716, conductor 1602, break contacts 1986, winding of relay 1997, make contacts 1911 and the winding of relay 1910 to battery. Relays 1920 and 1987 operate in a similar manner on the second pulse. Relay 1987, at break contacts 1986 opens the locking circuit of relays 1997 and 1910, and both of these relays restore.

Shortly after the last impulse, dialing transfer relay 1700 restores, and at break contacts 1701 completes a circuit for the operation of the code group selecting relay 1730. This circuit is from hold relay ground on conductor 1563, through make contacts 1988, conductor 1603 across Figs. 16 and 17, break contacts 1701, 1772 and 1781, conductor 2, cable 1799, conductor 2 again in Fig. 19, make contacts 1923, conductor 1626, and the winding of relay 1730 to battery. This same ground is also extended to conductor 1, by way of break contacts 1702, 1773 and 1782, but this is without effect, as conductor 1 is open at this time at the springs of the counting relays.

Code group selecting relay 1730 upon operating, at make contacts 1731 prepares the operation of the "second-digit-transfer" relay 1780 which now has ground on both sides of its winding; at make contacts 1733 connects the interrupter PU1 conductor 1734 to conductor 1687 to preselect the first group of codes; and at make contacts 1732 closes a circuit for the re-operation of register release relay 1560, by way of break contacts 1783 and 1774, conductor 1567, and the winding of relay 1560.

Register release relay 1560 upon operating, at break contacts 1561 disconnects hold relay ground from conductors 1564 and 1602, thereby causing the release of the register relays 1987 and 1920. Relay 1987, at make contacts 1988 removes hold relay ground from conductor 1603, thereby opening the previously traced operating circuit for code group relay 1730. This opening of the operate circuit of relay 1730 removes the shunt on the winding of the second-digit-transfer relay 1780 and that relay immediately operates in series with relay 1730, and locks the latter relay in the operated position from ground on the locking conductor 1529 through relay 1780 and make contacts 1731. Relay 1780 upon operating, at make contacts 1781 and 1782 prepares circuits to conductors 4 and 3 respectively; at break contacts 1783 opens the circuit of the register release relay 1560 which restores; and at make contacts 1783 prepares a new circuit for the same relay 1560. The opening and closing of contacts 1562 on relay 1560 is without effect at this time, due to the now open break contacts 1557 in series therewith.

The third or "tens" digit "0" of the call number "22062" now causes line relay 1510 to release and re-operate ten times, thereby causing the pulsing relay 1530 to send ten pulses to the register relays, in the manner previously explained. Relay 1700 operates on the first pulse as before, and releases shortly after the last pulse. Register relays 1910 and 1997 operate on the first pulse, 1920 and 1987 on the second, 1930 and 1977 on the third, 1940 and 1997 again on the fourth, 1950 and 1987 on the fifth, 1960 and 1977 on the sixth, 1970 and 1997 on the seventh, 1980 and 1987 on the eighth, 1990 and 1977 on the ninth and 1900 and 1997 on the tenth.

Shortly after the tenth impulse transfer relay 1700 again restores, and at break contacts 1701 closes a circuit for the operation of the "00" tens relay 1800. This circuit is from hold relay ground on conductor 1563 again, through make contacts 1998, conductor 1603, break contacts 1701 and 1772, make contacts 1781, conductor 4 and cable 1799, make contacts 1904, conductor 1840 across Figs. 17 and 18, and the winding of relay 1800 to battery. This same ground is also extended to conductor 3, through break contacts 1702 and 1773 and make contacts 1782, but without effect, as conductor 3 is open at the springs of the counting relays.

Tens relay 1800 upon operating, prepares circuits to the associated subscriber lines, four of which are indicated in Fig. 18. Relay 1800 also, at make contacts 1803 prepares a circuit for the third-digit-transfer relay 1770 now shunted by ground on both sides of its winding, at make contacts 1801 prepares a circuit for the 1–6 units relay 1820, and at make contacts 1802 completes a circuit for the operation of register release relay 1560. This circuit is from hold relay ground on conductor 1529, through contacts 1802, conductor 1709, make contacts 1783, break contacts 1774, conductor 1567, and the winding of relay 1560 to battery.

Register release relay 1560 upon operating, again opens break contacts 1561 to release the register relays. These relays releasing, open the operate circuit of tens relay 1800. The opening of the operate circuit of relay 1800 removes the shunt from the third-digit-transfer relay 1770, and this relay operates in series with relay 1800 and locks the latter operated from ground on conductor 1529 by way of conductor 1707 and make contacts 1803.

The third-digit-transfer relay 1770 upon operating, at make contacts 1771 prepares a circuit for the units-switching relay 1810, at make contacts 1772 and 1773 prepares circuits to conductors 6 and 5 respectively, and at break contacts 1774 opens the circuit of relay 1560, thereby causing this relay to again release. Finally relay 1770, at make contacts 1775 connects ringing machine starting ground to conductor 1601 from where it passes by way of break contacts 1618, conductor 1604, start conductor 1909 and cable 1908 to the ringing machine assumed to be included in the rectangle 1906.

The fourth or "units" digit "6" of the call number "22062" now causes line relay 1510 and pulsing relay 1530 to co-operate as before to send six impulses to the counting relays, with transfer relay 1700 operating again on the first pulse. The counting relays operate as before and at the completion of the sixth pulse, register relays 1960 and 1977 find themselves operated and locked. At the start of the sixth pulse however, when relay 1560 first operates, it immediately causes the operation of the units-switching relay 1810, from ground on conductor 1563, make contacts 1966, conductor 1798, break contacts 1791, make contacts 1771, and the upper winding of relay 1810 to battery. Relay 1810 upon operating, locks to conductor 1529 and reverses its contacts 1811, 1812 and 1814 to prepare the selection of a line in the "6 to 0" units group. This relay operates likewise, on the sixth pulse of any fourth digit greater than five.

When dialing transfer relay 1700 restores, shortly after the completion of the sixth impulse, it completes a circuit for the operation of the 1–6 units relay 1820. This circuit is from ground on conductor 1563, through make contacts 1978, conductor 1603, break contacts 1701, make contacts 1772, break contacts 1793, conductor 6 and cable 1799, make contacts 1965, conductor 1846, and the winding of relay 1820 to battery. The 1–6 units relay is thus operated direct from the springs of the sixth counting relay via conductor 1846 when the fourth digit is a "6," but if the fourth digit is a "1" it is controlled through the springs of the tens relays, by way of conductor 1841 and the springs of the first counting relay. This separation of the units control leads, on the first and sixth counting relays, facilitates the addition of P. B. X trunk selecting equipment, not shown.

The 1–6 units relay 1820 upon operating, extends the connector talking and test conductors 1703, 1704 and 1706 to the line conductors 1854, 1855 and 1856 by way of make contacts 1811, 1812 and 1814, make contacts 1824, 1825 and 1826, and make contacts 1807, 1808 and 1809. If the called line is busy, ground on the test conductor 1856 will then cause the operation of busy relay 1710 via break contacts 1792, but if the called line is idle, as will be assumed, battery will be on test conductor 1856 and the busy relay will therefore not operate. Units relay 1820 also, at make contacts 1828 prepares a circuit for the fourth-digit-transfer relay 1790 which is now shunted by grounds on conductors 1529 and 1708; and at make contacts 1727 completes a circuit for the re-operation of register release relay 1560 from ground on conductor 1529, by way of conductor 1797, break contacts 1796, and conductor 1567. Register release relay 1560 upon operating releases the register relays and thereby opens the operate circuit of units relay 1820. This removes the shunt from relay 1790 and that relay operates in series with relay 1820 and locks the latter operated over conductor 1708, through make contacts 1828.

The fourth-digit-transfer relay 1790 upon operating, at break contacts 1791 opens the operate circuit of the units switching relay 1810 now locked to conductor 1529; at break contacts 1793 and 1794 disconnects conductors 6 and 5; at make contacts 1794 prepares a circuit for the fifth digit transfer relay 1610; at make contacts 1795 prepares an alternative locking circuit for the register relays, shunting break contacts 1716; and at break contacts 1796 opens the circuit of register release relay 1560 which restores. Finally, relay 1790 at break contacts 1792 disconnects the busy relay from the test conductor, and at make contacts 1792 closes a circuit for the operation of switching relay 1720. This circuit is as follows: ground at make contacts 1556, break contacts 1539A, conductor 1528, upper winding of relay 1720, break contacts 1715, make contacts 1792, test conductor 1706, make contacts 1814, 1826 and 1809, test conductor 1856, and the cut-off and lockout relays of the line equipment, not shown, of line "206," to battery.

Switching relay 1720 operates over this circuit, in series with the line cutoff and lockout relays, and at make contacts 1725 locks over its lower winding to ground on conductor 1529. Relay 1720 also, at make contacts 1721 and 1722 extends the connection to the called line, at break contacts 1723 opens the circuit leading to the verification relay 1760, and at make contacts 1724 shunts its own upper winding, thereby putting direct ground on the test conductor. Finally relay 1720, at break contacts 1726 removes locking ground from verification relay 1750, at make contacts 1727 prepares a circuit for pickup relay 1630, and at make contacts 1728 prepares the interrupter start circuit.

The fifth or "ringing" digit "2" of the call number "22062" now causes line relay 1510 to release and re-operate twice. Pulsing relay 1630 follows as before to operate relay 1700 and the counting relays, with relays 1920 and 1987 operating on the second digit. Shortly afterwards, when transfer relay 1700 releases, it causes the fifth-digit-transfer relay 1610 to operate over the following circuit: ground on conductor 1563, contacts 1988, conductor 1603, contacts 1791 and 1702, make contacts 1773 and 1794, conductor 1684, contacts 1616 and the winding of relay 1610 to battery.

The fifth digit transfer relay upon operating, at contacts 1617 locks to ground on conductor 1563, at contacts 1611 and 1612 prepares circuits to the ringing relays 1640 and 1650, and at contacts 1613 prepares a locking circuit for the reverting call relay 1580 which is not effective however at this time. Relay 1610 also, at break-make contacts 1614 opens the pulsing circuit to the counting relays and extends it towards the verification circuits, now open, and at make contacts 1615 further prepares the circuit of pickup relay 1630. Relay 1610 in addition, at break contacts 1618 removes one of the multiple grounds from the ringing machine start conductor 1909 now grounded through make contacts 1983, and at make contacts 1619 completes a start circuit for the interrupter from ground at make contacts 1984, by way of conductor 1605, contacts 1619, conductor 1688, make contacts 1728, start conductor 1729 and cable 1908.

The ringing interrupter now starts and connects ground pulses representative of the different ringing codes to the ten ringing conductors R1 to R10 by way of the cables 1907 and 1908. All of these ringing conductors except R2 however, are now open at the springs of the counting relays. Furthermore, conductor R2 is open at the springs of the pickup relay. At the start of each ringing cycle, the interrupter connects negative battery momentarily to the PU2 conductor 1744 to mark the start of the second ten codes, and shortly thereafter to the PU1 conductor 1734 to mark the start of the first ten codes, which as previously indicated, are identical with the second ten except for the omission of the preliminary short ring. The battery pulse on conductor 1744 is without effect, due to the open make contacts 1743, but the battery pulse on conductor 1734 shortly thereafter, causes the pickup relay 1630 to operate, over the following circuit: battery on the PU1 conductor, make contacts 1733, conductor 1687, back contacts 1634, conductor 1686, contacts 1727, conductor 1685, relay 1630, conductor 1568, back contacts 1593, conductor 1519, contacts 1615, conductor 1603 left, contacts 1988 and conductor 1563 to ground at make contacts 1555. Pickup relay 1630 upon operating, at contacts 1631 extends the R2 ringing lead to the even code ringing relay 1650, and at contacts 1635 locks to the hold battery conductor 1625, which has steady battery connected to it at the start of each cycle and removed at the end of each cycle by the ringing interrupter. Relay 1630 thus operates at the second starting point of each ringing cycle, and releases at the end of each cycle. Make contacts 1632 are without effect at this time.

Ringing relay 1650 now follows the ground pulses on the coding conductor R2, by way of contacts 1922, conductor 1606, and contacts 1611 and 1631, and operates and releases in accordance with the code. At each operation, break contacts 1651 and 1653 "split the trunk," or disconnect the calling line from the called line, while make contacts 1651 and 1653 connect ringing current momentarily to the called line. This circuit is from battery through the ringing generator on conductor 1690 at the upper left in Fig. 16, through the protective lamp 1691, make contacts 1651, conductor 1680, make contacts 1721, positive talking conductor 1703, make contacts 1811, 1824, and 1807, line conductor 1854, ringers of the called line in parallel, line conductor 1855, make contacts 1808, 1825 and 1812, negative talking conductor 1704, make contacts 1722, conductor 1681, and make contacts 1653 to ground. Relay 1650 also, at make contacts 1652 passes a portion of each pulse of ringing current back to the calling line, by way of the low capacity ring back condenser C3, contacts 1652, conductor 1504 right, break contacts 1752, conductor 1505 and the talking condenser C2. Ringing relay 1650 also, at make contacts 1654 causes drain relay 1620 to operate and release in unison. Relay 1620 is made slow to release however, and during the short time interval between the release of the two relays, drain relay 1620 at make contacts 1621 and 1622 shorts the called line momentarily with ground and battery through a resistance, thereby draining the ringing voltages from the said called line.

The called party, upon hearing his telephone ringer repeat his code, responds by removing the receiver or handset in the usual manner to close the called line loop. Upon the next restoration of the ringing and drain relays 1650 and 1620 therefore, back bridge relay 1590 operates over the following circuit: ground through the upper winding of relay 1590, conductor 1501, break contacts 1751, conductor 1503, break contacts 1621, 1641 and 1651, conductor 1680, make contacts 1721, conductor 1703, make contacts 1811, 1824 and 1807, line conductor 1854, transmitter of the answering telephone, line conductor 1855, make contacts 1808, 1825 and 1812, conductor 1704, make contacts 1722, conductor 1681, break contacts 1653, 1643 and 1622, conductor 1505 right, break contacts 1752, conductor 1504, and the lower winding of relay 1590 to battery.

Back bridge relay 1590 upon operating, at make contacts 1591 closes a circuit to the upper winding of battery reversing relay 1520, from ground on conductor 1563 through break contacts 1587, whereupon relay 1520 operates and reverses the battery feed to the calling line in the well known manner. Back bridge relay 1590 also at make contacts 1592 closes a circuit from ground on conductor 1563 to the back bridge slave relay 1570 which likewise operates but without effect at this time; at break contacts 1593 opens the locking circuit of pickup relay 1630 which restores and disconnects the ringing relays; and at make contacts 1593 completes a circuit for the operation of register release relay 1560, from ground on conductor 1563, by way of make contacts 1988, conductor 1603, make contacts 1615, conductor 1519, make contacts 1593 and the winding of relay 1560 to battery. Relay 1560 releases the register relays and these in turn open the circuit of relay 1560 which also releases.

The talking circuit between the calling and called stations is now complete, with line relay 1510 supplying talking battery to the calling line, and back bridge relay 1590 to the called line. The complete connection is from station A in Fig. 1, over the line conductors 174 and 175, make contacts 202 and 203 in the finder, make contacts 221 and 222, break contacts 241 and 242, conductors 273 and 274, make contacts 511 and 512 in the selector, conductors 501 and 502, break contacts 611 and 612, make contacts 621 and 622, make contacts 721 and 722, conductors 742 and 743, break contacts 1582 and 1584 in the connector; make contacts 1522, break contacts 1583 and talking condenser C2, and make contacts 1524 and talking condenser C1; conductors 1505 and 1503, break contacts 1622 and 1621, break contacts 1643 and 1641, break contacts 1653 and 1651, conductors 1681 and 1680, make contacts 1722 and 1721, conductors 1704 and 1703, make contacts 1812 and 1811, make contacts 1825 and 1824, make contacts 1808 and 1807, and line conductors 1855 and 1854 to the called station.

If the called party hangs up first, back bridge relay 1590 restores, and releases relays 1520 and 1570, but nothing else happens. When the calling party hangs up however, the connector line relay 1510 restores and drops the pulsing relay 1530 but without immediate effect, as the pulsing circuit is now open at break contacts 1614 and make contacts 1714. Hold relay 1540 also restores after a short delay, and at make contacts 1542 removes connector ground from the test conductor 744 and opens the circuit of hold slave relay 1550. Removal of ground from the test conductor 744 causes the release of switching relay 510 in the selector, as well as that of the line cutoff and lockout relays in the line circuits. Switching relay 510 at make contacts 513 removes selector ground from the hold conductor 276. This opens the locking circuits of the tens and units relays in both the selector and the finder, and these relays also release. Switching relay 510 also at break contacts 517 closes a point in the reset circuit of the link select relay 470. Meanwhile in the connector the hold slave relay has also restored, and at make contacts 1554, 1555 and 1556 opened the locking circuits for relays 1610, 1720, 1770, 1780, 1790, 1810, 1820 and 1800, and these relays all restore.

*Permanent timing*

In the case of a "permanent," that is a shorted line, or a receiver accidentally off the hook, or any line condition resulting in seizure of a finder-selector link not followed by dialing, the selector will, after a predetermined time interval, cause the forced release of the link and lock out the faulty line to prevent re-seizure.

Upon seizure of the selector, the selector line relay 520 operates over the conductors 273 and 274 in the usual manner, and causes the successive operation of the pulsing relay 530, the hold relay 540 and the hold slave relay 560, as described in the preceding section. The hold relay, at make contacts 541 grounds the test conductor 275, thereby operating the line cutoff and lockout relays of the faulty line, just as for a normal call. The hold slave relay, at make contacts 561 likewise grounds the hold conductor 276 to hold the finder tens and units relays as before, at make contacts 562 starts the timer, and at make contacts 565 connects the permanent timing relay 590 to the timing start conductor 557.

The timer, which is common to the exchange now starts, and every two minutes momentarily grounds the "timing start" conductor 557. The timer also places solid ground on the "time release" conductor 556 every two minutes, just before the ground pulse occurs on conductor 557. This time-release ground is removed momentarily, just before the end of each two minute period.

Permanent timing relay 590 may therefore operate from conductor 557 by way of break contacts 593 and make contacts 565, any time up to two minutes after the seizure of the selector, depending on the position of the timer at starting. When relay 590 thus operates, it locks to make contacts 594, and at make contacts 592 replaces the ground on the hold conductor from contacts 591 with ground from conductor 556, thereby locking the finder tens and units relays to the timer. When therefore approximately two minutes later, the timer removes the ground from conductor 556, the finder tens and units relays release and break the connection. This in turn releases the selector. In the line circuit, the cutoff relay, such as relay 190 for example, also restores, but the lockout relay, being made slow to release, remains operated for an instant. The line relay re-operates over the faulty line upon the release of the cutoff relay, and at contacts corresponding to contacts 171 locks the lockout relay operated. The marking conductors, such as 197 and 198, are now open at the operated lockout relay, while the operated line relay marks the line busy at the connector. This line is thus prevented from causing any further trouble until the short is removed, when the line relay will automatically release and restore the line equipment to normal.

A permanent line is thus disconnected in all cases, in from two to four minutes. Should dialling occur and the selector switch through, any time before the forced release occurs however, the release of the hold slave relay will cause the release of relay 590 and stop the timing.

*Selector blocked call*

Figure 8:
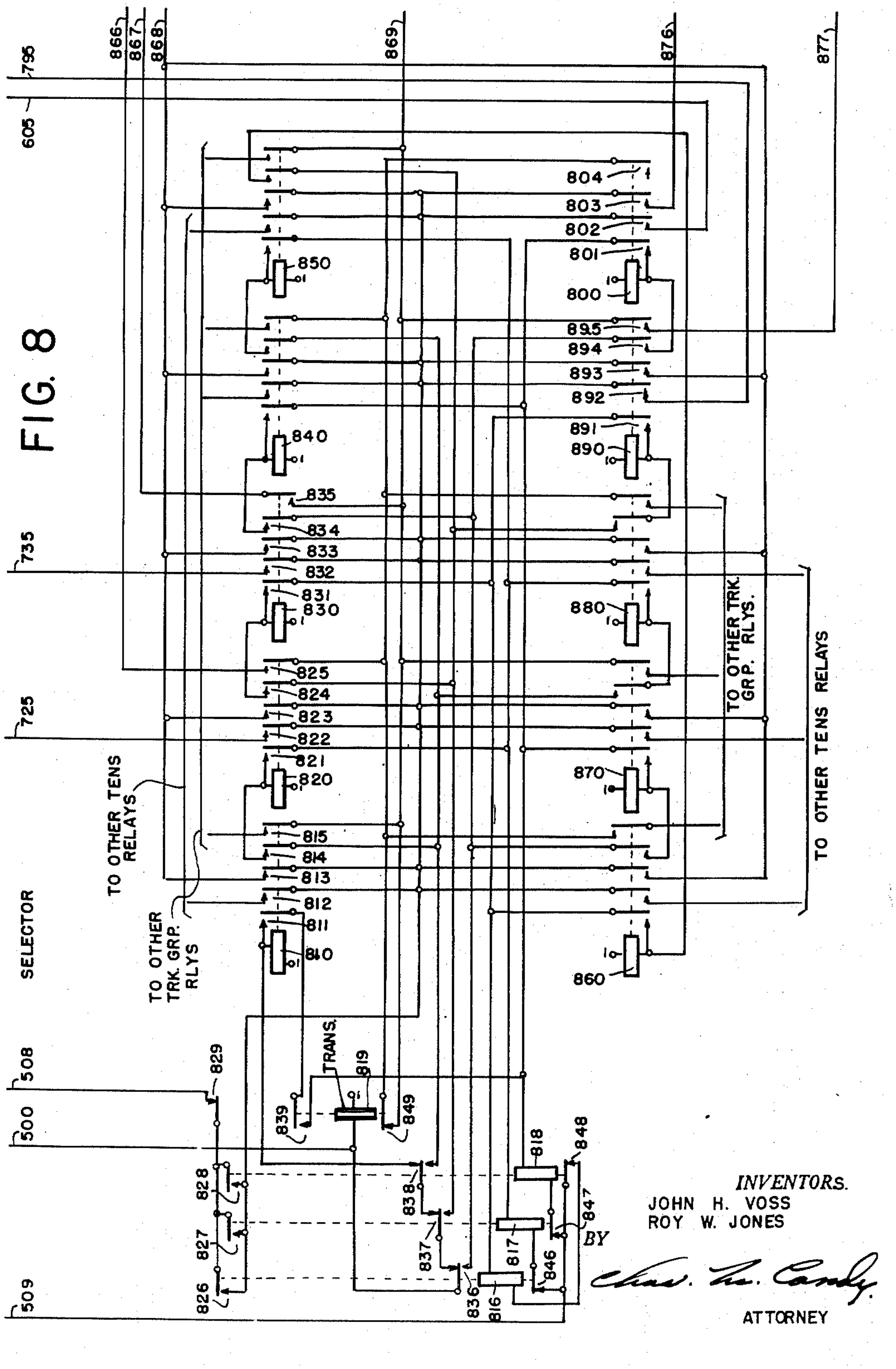
Figure 9:
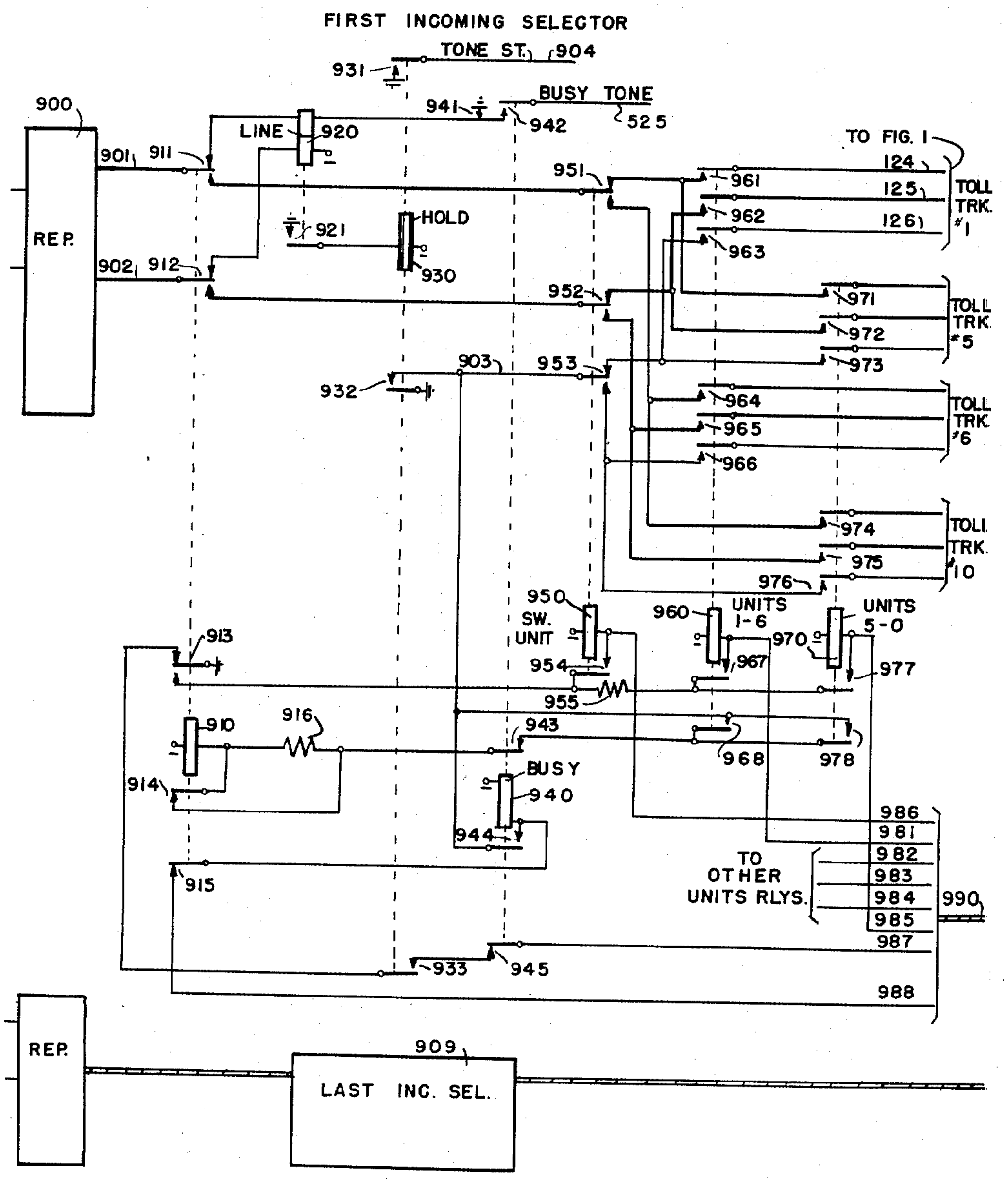

If seizure of the selector is followed by proper dialing, as in the completed call previously described, but the selector for some reason fails to switch through, the register relays of Fig. 8 and the trunk access relays such as 1010, 1030 and 1040 in Fig. 10 will not restore. If these relays remain thus operated beyond the normal release time of the slow to release kickoff relay 1050, the latter relay will release.

The kickoff relay upon releasing, at make contacts 1051 opens another point in the operate circuit of the associated access relays, now also open at break contacts 1032 and 1014. Relay 1050 also, at break contacts 1052 grounds the kickoff conductor to advance the trunk selecting relays to the next idle trunk, and at break contacts 1053 grounds the lockout conductor to operate the busy relay in the selector.

The busy circuit is as follows: ground at break contacts 1053, make contacts 1014A, conductor 657, cable 658, conductor 657 in Fig. 6, break contacts 515, and the winding of busy relay 570 to battery. Relay 570 upon operating over this circuit, at make contacts 572 connects busy tone to the calling line, at break contacts 573 opens the pulsing circuit, at make contacts 575 locks to the hold conductor by way of break contacts 514, at break contacts 576 disconnects the switching relay 510, and at break contacts 574 opens the locking circuit to the register relays. The register relays thereupon restore, and release the associated trunk access and trunk group relays.

The kickoff circuit, energized at the same time as the busy circuit, from the kickoff relay, is as follows: assuming relays 1060 and 1120 energized as in the previous call: ground at break contacts 1052, make contacts 1065, conductor 1127, make contacts 1123, contacts corresponding to make contacts 1131 on the second trunk busy relay, not shown, and the winding of the second preselect relay, not shown, to battery at break contacts 1101. The second preselect relay upon operating over this circuit, releases relay 1120 and grounds the 2–7 units marking conductor 1137. The calling station upon hearing the busy tone, will hang up and call again, whereupon the call will be directed to the second trunk.

*All trunks busy*

With reference to Fig. 11, let it be assumed that ten calls in quick succession to the "200" group of lines have made all connectors of this group busy. Upon seizure of the last trunk by the preselect relay 1180, trunk busy relay 1170 restores, and causes the operation of reset relay 1100 from ground through make contacts 1184 and break contacts 1171. Relay 1100 in turn, at contacts 1101 opens the circuit of relay 1180 which restores, and at contacts 1103 opens the circuit of relay 1180 which restores, and at contacts 1103 opens the circuit of the all-trunks-busy relay 1190, which being slow to release remains operated for an interval.

Meanwhile, the release of relay 1180, instead of re-operating one of the preceding preselect relays, as is normal, establishes a new circuit for relay 1100, from ground at break contacts 1183, by way of break contacts 1164, 1142, 1111, 1131, 1151, 1171, and similar contacts on the other preselect and trunk busy relays, not shown, thereby holding relay 1100 operated. Relay 1190 will therefore release, at the expiration of its delay period, to prepare the overflow register and busy circuits.

If now, another call to this group of lines is attempted, with all trunks held busy in this manner, the resulting ground on conductor 1126 will operate the overflow meter 1104 instead of the peg count meter 1105. Also, break contacts 1192 will pass ground to the selector busy relay 570 by way of conductor 1159, contacts 1064A and 1014A, conductor 657 and break contacts 515. The busy relay operates as before to give busy tone and release the register and the trunk access and trunk group relays.

As soon as any connector becomes free, its associated trunk busy relay re-operates. This opens the chain circuit to reset relay 1100 which restores. This permits the preselect relay of the freed trunk to also operate, thereby making this trunk available for another call. Relay 1190 also re-operates on the release of relay 1100.

*Digit absorption*

A first digit "1," or any single preliminary impulse, such as might be caused by careless removal of the receiver or handset at the calling station, is absorbed at the selector. This is done by passing the locking circuit of the first counting relay 810 through make contacts 839 on transfer relay 819. Relays 819 and 810 operate on the first half of the pulse in the usual manner, and on the second half of the pulse, relay 818 operates and locks relay 810 in series with it, by way of contacts 839 and 811. Shortly thereafter however, transfer relay 819 restores and opens this circuit, thereby releasing relays 818 and 810. Such a preliminary pulse is therefore ineffective, and does not interfere with subsequent dialing of a proper call number.

In addition to the foregoing, any second digit other than the digits "2" or "3," is absorbed at the connector. At the end of this digit, it will be remembered, when the dialing transfer relay 1700 restores, it grounds conductors 2 and 1 leading to the springs of the counting relays. If either of the counting relays 1920 or 1930 are operated at this time one of these grounds will be effective to operate one of the code group select relays 1739 or 1740 as required, by way of contacts 1923 or 1933. If any other counting relay than these two is operated however, the ground will pass instead to conductor 1567, and thence to register release relay 1560. Relay 1560 thereupon operates and releases the register. If the calling party has noticed the error, he may proceed to dial the correct second digit, followed by the remaining digits, and the connector will complete the call, just as though the extra digit had not been dialled. Otherwise the call number will have a digit missing, a wrong number will be set up, and the connector will not ring. The calling party must then hang up and dial over.

*Reverting calls*

To make a reverting call, that is a call to another station on the same line, the calling subscriber, such as subscriber "A" again, in Fig. 1, dials the regular directory number of the wanted subscriber. For this purpose, it will be assumed that there are more than ten parties on this line, and that the call number of the wanted station is "23013," representing line "201," the second code group, and the third code therein.

Upon the dialing of the first digit "2," the selector employed in the call will seize an idle connector in the "200" group of connectors, exactly as before. Upon the dialing of the second digit "3," the register relays of this connector will count off three steps, leaving register relays 1930 and 1977 operated. Now when the dialing transfer relay 1700 restores, following the third pulse, ground on conductor 1603 passes through break contacts 1701, 1702, 1773 and 1782 to conductor 1 and hence through make contacts 1933 and conductor 1627 to the second code group select relay 1740, which operates. Relay 1740, at contacts 1741 prepares its own locking circuit and the circuit of the second digit transfer relay 1780, at contacts 1743 prepares a circuit for the PU2 pickup conductor 1744, and at contacts 1742 closes a circuit to register release relay 1560 over conductor 1567. Relay 1560 thereupon operates and releases the register, and permits relay 1780 to operate to prepare circuits for the next digit.

Upon the dialing of the third digit "0," the connector register relays will again count off ten steps, leaving relays 1900 and 1997 operated. The release of transfer relay 1700 after the last impulse now passes ground on conductor 1603 to conductor 4, and thence by way of make contacts 1904 and conductor 1840 to tens relay 1800 which operates. Relay 1800 at contacts 1803 prepares the circuit of the third digit transfer relay 1770, and at contacts 1802 passes operating ground to conductor 1709 and thence to register release relay 1560, which operates as before to release the register. The third digit transfer relay 1770 then operates and releases relay 1560.

The fourth digit "1" of the call number "23013" next causes the register to take one step, leaving relays 1910 and 1997 operated. Upon the subsequent release of dialing transfer relay 1700, therefore, ground from conductor 1603 is passed to units relay 1820 by way of break contacts 1701 and 1702, make contacts 1773, break contacts 1794, conductor 5, contacts 1915, conductor 1841 and make contacts 1801. Relay 1820 now operates and extends the connector talking and test conductors 1703, 1704 and 1706 through to the talking and test conductors 184, 185 and 186 of the calling line, by way of break contacts 1811, 1812 and 1814, make contacts 1821, 1822 and 1823, and make contacts 1804, 1805 and 1806. Ground on test conductor 186 through break contacts 172 of the now normal line relay 170 in Fig. 1, is thereupon connected through to conductor 1706 and thence by way of break contacts 1792 to busy relay 1710 which immediately operates and locks. Units relay 1820 also, at contacts 1828 prepares the circuit of the fourth digit transfer relay 1790, and at contacts 1827 passes ground to conductor 1797 for the re-operation of register release relay 1560. The register relays now restore, and the fourth digit transfer relay 1790 operates, and releases relay 1560.

Meanwhile, the busy relay 1710 upon operating, at make contacts 1711 connects busy tone to the calling line, by way of conductor 1502, condenser C4, conductor 1504, break contacts 1752 and conductor 1505, and at make contacts 1712 locks to ground on conductor 1563, by way of break contacts 1753, conductor 1506 and break contacts 1587. Relay 1710 also at make contacts 1714 prepares a holding circuit for the connector, at break contacts 1715 disconnects the switching relay 1720, and at break contacts 1716 opens another point in the locking circuit of the register relays. Upon the operation of relay 1790 following the release of the register however, these contacts are shunted by make contacts 1795, to permit dialling the final digit.

The fifth and final digit "3" of the call number "23013" now causes the register to count off three steps, leaving relays 1930 and 1977 operated. Upon the release of transfer relay 1700, following the final pulse of this digit, ground from conductor 1603 is passed to the fifth digit transfer relay 1610 by way of break contacts 1701 and 1702, make contacts 1773 and 1794, and conductor 1684. Relay 1610 thereupon operates and locks, as before, to prepare the ringing circuits and to start the interrupter. Relay 1610 also at make contacts 1615 prepares the circuit of the pickup relay 1630, but this is now without effect as the circuit of the pickup relay is still open at make contacts 1727 on the switching relay. For this reason, ringing does not proceed, but the calling station is advised by the busy tone on the line, that the connection has been extended.

The calling party, upon completing the dialing and hearing the busy signal, now hangs up. This causes the immediate release of the connector line and pulsing relays 1510 and 1530. The circuit of hold relay 1540 is thereby opened, at make contacts 1511 and 1531, but before this slow to release relay can restore and release the connector, break contacts 1531 ground the test conductor, thereby holding the line circuit cut-off and lockout relays and the connector hold slave relay in the operated position. This circuit may be traced as follows: ground, break contacts 1531, make contacts 1552, pulsing conductor 1518, make contacts 1614, break contacts 1662 and 1672, conductor 1683, make contacts 1714 and 1792, test conductor 1706, break contacts 1814, make contacts 1823 and 1806, line test normal conductor 186 to Fig. 1, break contacts 172, relays 190 and 180 in series to battery, on over the finder test conductor 176, make contacts 204 and 223, break contacts 243, selector test conductor 275, break contacts 613, make contacts 623, conductor 710, make contacts 724, connector test conductor 744, make contacts 1551, and the winding of relay 1550 to battery. In the selector, this ground also serves to hold the switching relay 510, by way of conductors 275 and 617, make contacts 627 and conductor 507.

Now, when the hold relay restores, and opens the circuit of hold slave relay 1550, at contacts 1542, relay 1550 is not affected thereby. At break contacts 1543 however, hold relay 1540 closes a circuit to the reverting call relay 1580, as follows: ground on the test conductor 744, contacts 1543, conductor 1514, make contacts 1713, conductor 1509, and the lower winding of 1580 to battery.

Reverting call relay 1580 operates over this circuit and at make contacts 1588 closes a locking circuit to its own upper winding, over conductors 1507 and 1508 and make springs 1613. Relay 1580 also, at make contacts 1581 prepares a reverting call tone circuit, at break contacts 1582, 1583 and 1584 disconnects busy tone and line relay 1510 from the line preparatory to ringing, at make contacts 1585 prepares a locking circuit for battery reversing relay 1520, at make contacts 1586 prepares an operate circuit for relay 1520, and at make contacts 1589 prepares an alternate operate circuit for switching relay 1720. Finally, relay 1580 at make contacts 1587 prepares a locking circuit for the back bridge slave relay 1570, and at break contacts 1587 opens the locking circuit of busy relay 1710, which thereupon restores.

Busy relay 1710 upon releasing, at make contacts 1711 further opens the busy tone circuit, at make contacts 1712 further opens its own locking circuit, at make contacts 1713 opens the operate circuit of reverting call relay 1580, and at break contacts 1715 completes the operate circuit of switching relay 1720. At this time relay 1720 is shunted by ground through preliminary make contacts 1714 on the busy relay, which of course, open last. As soon as contacts 1714 open however, relay 1720 operates, locks via preliminary make contacts 1725 to conductor 1529, and at contacts 1724 again places direct ground on the test conductor. Relay 1720 also, at make contacts 1721 and 1722 prepares the line ringing circuit, at break contacts 1723 and 1726 disconnects the verification relays, at make contacts 1728 starts the interrupter, at make contacts 1727 connects the pickup relay 1630 to the PU2 pickup conductor 1744, via contacts 1634 and 1743.

When therefore, the interrupter connects battery momentarily to the PU2 pickup conductor, at the start of the next ringing cycle, just prior to the preliminary short pulse included in the codes of the second code group, pickup relay 1630 operates and locks as before, to battery on conductor 1625. The R3 code conductor from the interrupter now passes ground pulses corresponding to the third code of the second ten codes to the odd code ringing relay 1640, by way of make contacts 1932, conductor 1607, and make contacts 1612 and 1632. Code ringing relay 1640 follows the coded pulses, and at each impulse, contacts 1643 and 1641 connect generator to the negative line conductor and ground to the positive line conductor respectively, while contacts 1644 operate the drain relay. The various ringers on the line respond accordingly.

When the called subscriber answers, in response to hearing his ringer give the code signal for that station, back bridge relay 1590 operates over the line loop, on the next release of ringing relay 1640, or immediately, if the answer occurs during a silent interval, when relay 1640 is already normal. Relay 1590 upon operating closes make contacts 1591, but without effect, due to the open break contacts 1587. Relay 1590 also, at break contacts 1593 releases pickup relay 1630 to stop the ringing, at make contacts 1593 operates register release relay 1560 to release the register relays, and at make contacts 1592 closes a circuit to the back bridge slave relay 1570.

The back bridge slave relay 1570 thereupon operates, and locks to conductor 1563, and at make contacts 1571 connects reverting call tone from conductor 1594 to the line to advise the called party of the nature of the call, so that he will remain on the line. This circuit extends through make contacts 1581, conductor 1502, condenser C4, conductor 1504, break contacts 1752, conductor 1505, break contacts 1622, 1643 and 1653, make contacts 1722 and conductor 1704 to the called line, through the called telephone, where it is made audible in the receiver, back over the other side of the line to conductor 1703, through make contacts 1721, conductor 1680, break contacts 1651, 1641 and 1621, conductor 1503 right, break contacts 1751 and conductor 1501 to ground at the upper winding of relay 1590. Relay 1570 also, at make contacts 1572 connects battery reversing relay 1520 to the timer RTP conductor 1547, to which the timer 555 connects a ground pulse of one second duration approximately every three seconds. At the same time, the timer also connects a second ground pulse of slightly less than three seconds' duration, to the TCO conductor 1548.

The next pulse from the timer on conductor 1547 therefore, is passed by way of contacts 1572 and 1536 to the lower winding of relay 1520, which relay thereupon operates and locks to ground at make contacts 1585. Relay 1520 also reverses its upper contacts but this is now without effect, due to the circuit to line relay 1510 being open at this time at break contacts on the reverting call relay. Relay 1520 also, at make contacts 1527 places timer ground from conductor 1548 on the test conductor, by way of make contacts 1589, conductor 1528 and contacts 1724, 1715 and 1792, in place of the ground at break contacts 1526, which is at the same time disconnected.

When therefore, the timer removes ground from conductor 1548, some three seconds later, it also removes ground from the test conductor, and consequently from the line cutoff and lockout relays 190 and 180, from the selector switching relay 510, and from the connector hold slave relay 1550. Switching relay 510 thereupon releases to free the selector and the associated finder, and hold slave relay 1550 likewise releases to free the connector and disconnect the reverting call signal. The line cutoff relay 190 also restores, whereupon line relay 170 promptly re-operates in series with the answering called telephone, and locks up the slow to release lockout relay 180.

The calling subscriber, noting the cessation of ringing, now comes back in on the line and the connection is complete, with talking battery furnished to both parties from the line relay 170, which also guards the line against instrusion, at make contacts 172. The line remains locked out in this manner until both parties have hung up, when line relay 170 restores, and releases lockout relay 180.

*Calls to manual office*

If a local subscriber, such as subscriber "A" in Fig. 1, wishes to call a subscriber in the manual office 2020 in Fig. 20, he has merely to dial the digit "9" to seize a trunk to the said office, and when the manual operator answers, give the number of the wanted station. The removal of the receiver at station "A" causes seizure of a finder selector link such as shown in Figs. 2, 5, 6, 7 and 8, just as for a local call, and when the selector returns dial tone, the subscriber dials. The selector line and pulsing relays respond, and pass nine impulses to the register. Transfer relay 819 operates on the first impulse, and the counting relays count off nine steps, leaving relays 890 and 816 operated.

When transfer relay 819 restores, following the last impulse, break contacts 829 close a circuit to the selector tens relay 790 as follows: ground at make contacts 561 on the hold slave relay, hold conductor 276 left, break contacts 514, conductor 508, contacts 829, 826 and 892, conductor 795, and the winding of relay 790 to battery. This same ground also passes through make contacts 893 to access relay 1010, by way of conductor 868. Relays 790 and 1010 operate over these circuits, and relay 1010 extends the selector units marking conductors through to the trunk group relays of the various trunk groups. Relay 1010 also at contacts 1011 closes a circuit to the first selector group "trunk group" relay, not shown, in the 900 group of trunk group relays indicated by the rectangle 1008. This circuit extends by way of conductor 869 to the register of Fig. 8, and thence through make contacts 895 and conductor 877 to the trunk group relays 1008. The trunk group relay thus operated extends the units marking conductors to the associated trunk select relays 1009, which, assuming all trunks in this group idle, will ground the 1–6 units conductor back to the selector and the units relay 620. This circuit is from ground at the trunk select relays 1009, through the trunk group relays 1008, cable 1094, make contacts 1017, conductor 651, cable 658 up, conductor 651 in Fig. 6 and the winding of relay 620 to battery.

The selector units relay 620 operates over this circuit and extends the talking and test conductors 501, 502 and 275 through to the trunk conductors 154, 155 and 156, by way of break contacts 611, 612 and 613, make contacts 621, 622 and 623, conductors 712, 711 and 710 and make contacts 792, 793 and 794. The selector thereby forwards ground from make contacts 541 to test conductor 156, to make this trunk busy to the other selectors. This ground also extends to conductor 156 in Fig. 1, where it passes through break contacts 142 and operates the cutoff and lockout relays 160 and 150 of this trunk's line equipment, in order to clear the line relay 140 from the trunk. In addition, the ground on conductor 275 causes the operation of the selector switching relay 510 via conductor 617, make contacts 627, conductor 507 and break contacts 576.

Switching relay 510 upon operating, at break contacts 511 and 512 disconnects line relay 520 from the line, and at make contacts 511 and 512 extends the calling line through to the trunk conductors 154 and 155, and so to the repeater 149 in Fig. 1. The repeater thereupon being seized, switches the line through to the manual office, returns ground on test conductor 156, and removes ground from conductor 1096 to release the associated trunk busy relay, not shown, in the trunk select relay group 1009, and thereby preselect the next idle trunk.

Switching relay 510 also, at break contacts 514 opens the locking circuit of register relays 816 and 890 which restore, at make contacts 513 connects ground from contacts 591 to the hold conductor 276, and at break contacts 513 opens the pulsing circuit and the circuit of hold relay 540. The line and pulsing relays 520 and 530 now restore, followed shortly by the hold and hold slave relays 540 and 560. The extension of the line to the distant office automatically signals an operator, who completes the call as requested.

*Calls to toll office*

A call to the toll office is handled similarly to a call to the manual office described in the preceding section, except that the calling subscriber dials an "0" instead of a "9," and that the trunk selecting equipment of Figs. 12, 13 and 14 is employed by the selector to select the trunk.

When therefore, the calling subscriber dials the digit "0" after removing his receiver and listening for dial tone, the selector register relays count off ten steps, leaving relays 800 and 818 operated, and locked in series to ground on conductor 509 in the usual manner. When therefore, transfer relay 819 releases, following the final impulse, it closes a circuit to the selector tens relay 600 as follows: ground at make contacts 561, hold conductor 276 left, break contacts 514, conductor 508, break contacts 829, make contacts 828, make contacts 802, conductor 605 and the winding of relay 600 to battery. A branch of this circuit also extends to the trunk access relay 1210, by way of make contacts 803 and conductor 876, winding of relay 1210, break contacts 1212 and 1242, make contacts 1251, break contacts 1234 and 1214 and corresponding contacts on the other access relays, not shown, and break contacts 1246 to battery through resistor 1247.

Relays 600 and 1210 operate immediately over these circuits. Relay 600 at its lower make contacts extends the associated toll trunks to the springs of the units relays, and at make contacts 601 locks to ground on the hold conductor 276, by way of the locking conductor 713 and the resistor 616. Relay 1210, at its lower make contacts, extends the selector units marking conductors from Fig. 6 through to the springs of the first selector group trunk group relay 1330 over the cable 1293. Relay 1210 also, at preliminary make contacts 1213 locks to battery through resistor 1247 independently of break springs 1242 and 1251, at break contacts 1212 opens its own pull up circuit, and at break contacts 1214 opens the pull up circuit of the other access relays as well as the locking circuit of all of the access relays succeeding it in the chain. Finally, relay 1210, at make contacts 1215 causes the normally brief operation of lockout relays 1240 and 1245, and at make contacts 1211 causes the operation of group relay 1330 over conductor 1292.

Group relay 1330 upon operating, at its lower make contacts extends the selector units marking conductors through to the toll trunk selecting relays of Fig. 14, at preliminary make contacts 1333 locks up independently of the break contacts 1372 in the operate circuit, and at break contacts 1332 opens its own operate circuit. Relay 1330 also at break contacts 1334 opens a point in the operate circuit of all of the group relays, as well as the locking circuit for all of the group relays following it in the chain. Relay 1330 further, at make contacts 1331 causes the operation of lockout relays 1370 and 1380. Relay 1370 at break contacts 1372 further opens the group relay pull-up circuits and at make contacts 1374 grounds conductor 1300 for the operation of the peg count meter 1405.

Assuming all of the toll trunks to be idle, and the first trunk select relay 1420 operated as shown, immediately following the extension of the units marking conductors to Fig. 14, relay 1420 passes ground from its closed make contacts 1421 back to the selector for the operation of the 1–6 units relay 620 over the following circuit: ground, conductor 1303, make contacts 1337, conductor 1262, cable 1293, conductor 1262 in Fig. 12, make contacts 1217, conductor 651, cable 658, conductor 651 in Fig. 6, and the winding of relay 620 to battery.

The selector units relay 620 upon operating, at make contacts 621 and 622 extends the selector talking conductors 501 and 502 through make contacts 602 and 603 to the trunk line normal conductors 124 and 125 of the first toll trunk, at make contacts 623 extends the test conductor 275 through to the test normal conductor 126, at make contacts 628 locks to the hold conductor 276 through resistor 615, and at make contacts 627 extends the test conductor 275 to conductor 507 and the switching relay 510. The selector thereupon forwards ground from make contacts 541 to test conductor 126 to make the trunk busy to the other selectors. This ground also extends through break contacts 112 in Fig. 1 and operates the line cutoff and lockout relays 130 and 120 to clear the trunk of attachments.

Switching relay 510 upon operating, opens break contacts 514 to release the operated register relays and the trunk access and trunk group relays 1210 and 1330, whereupon lockout relays 1240 and 1245 also restore, and re-establish the circuit of the slow to release kickoff relay 1250, in time to prevent the release of this relay. Switching relay 510 also at contacts 511 and 512 disconnects the selector line relay 520 as before and extends the calling line through to the repeater 139 in Fig. 1, by way of conductors 124 and 125. The repeater thereupon returns ground on the test conductor and switches the calling line through to the toll office. The selector relays 520, 530, 540, 560, 818 and 800 now restore, while the extension of the call to the distant office automatically signals a toll operator, who responds in the usual manner.

Seizure of the repeater also causes the repeater to open the normally grounded conductor 1412 leading to the normally operated trunk busy relay 1410. Relay 1410 thereupon restores and causes the automatic operation of the next preselect relay and the resultant release of preselect relay 1420. Successive trunks are thus preselected in rotation by Fig. 14, in the same manner as described for Fig. 11.

Should the selector fail to switch through promptly, even though trunks are available, so that access relay 1210 and lockout relay 1240 remain operated, the slow to release kickoff relay 1250 will restore, opening contacts 1251, and closing contacts 1252 and 1253. Contacts 1252 connect ground to conductor 1260 for the operation of the next preselect relay in Fig. 14 by way of cable 1293, contacts 1335, conductor 1301 and make contacts 1424, while contacts 1253 cause the operation of the selector busy relay 570, by way of contacts 1213A, conductor 657, cable 658, conductor 657 in Fig. 6, and contacts 515. The calling party is thus given a busy signal, and a new trunk is made available for the next call, or a repetition of the same call.

*Switching-through calls*

Switching-through calls from the automatic office 2022 to the toll office 2021, come in over one way repeaters as previously mentioned, to a special incoming selector such as shown in Fig. 9. The associated repeater is represented by the rectangle 900 on the upper left side of the sheet.

Repeater 900 upon being seized over the incoming trunk, places a bridge across conductors 901 and 902, thereby causing the operation of line relay 920 from ground at break contacts 941, by way of break contacts 911 and 912. Hold relay 930 thereupon operates and at make contacts 931 grounds the tone start conductor 904. Relay 930 also, at make contacts 932 grounds the test conductor 903, and at make contacts 933 closes a circuit to the access relay, not shown, corresponding to this selector, in the incoming trunk access relays 1205. This circuit is from ground at break contacts 913, through make contacts 933, break contacts 945, conductor 987, and cable 990 to the relays 1205 which are similar to those in the upper part of Fig. 12.

The seized access relay, not shown, in the rectangle 1205, thereupon operates, and extends the selector units marking and busy conductors through to the springs of the incoming selector group "trunk group" relay 1310. The seized access relay at the same time grounds conductor 1290 to cause the operation of relay 1310, which relay thereupon further extends the units marking conductors to the toll trunk select relays of Fig. 14. Fig. 14, assuming the first toll trunk to be idle, and relays 1410 and 1420 operated as shown, immediately returns ground over conductor 1303 to the selector to operate the 1–6 units relay 960, by way of make contacts 1317, conductor 1261A, cable 1291, springs of the operated access relay, not shown, cable 990, and conductor 981.

The 1–6 units relay 960 upon operating, at make contacts 963 connects ground from make contacts 932 to the test normal conductor 126 to make the toll trunk busy to the other selectors, and to operate the trunk line cutoff and lockout relays 130 and 120, through break contacts 112. Relay 960 also, at make contacts 961 and 962 prepares the talking circuit, at make contacts 967 prepares its own locking circuit, and at make contacts 968 closes a circuit to the switching relay 910, from ground at make contacts 932, and through make contacts 968 and break contacts 943 and 914.

Switching relay 910 operating over the foregoing circuit, at break contacts 915 opens the operate circuit of the busy relay 940, at break contacts 914 cuts resistor 916 into its own circuit, at make contacts 913 locks up the operated units relay 960 through resistor 955, and at break contacts 913 removes ground from conductor 987 and from the corresponding access relay, not shown, in trunk access relays 1205. This relay thereupon immediately restores and releases trunk group relay 1310. Switching relay 910 also, at break contacts 911 and 912 disconnects the selector line relay 920, and at make contacts 911 and 912 extends the connection to the toll repeater 139 in Fig. 1, by way of break contacts 951 and 952, make contacts 961 and 962, and the line normal conductors 124 and 125. This causes seizure of repeater 139, which thereupon switches the call through to the toll office, returns ground on conductor 126 to hold the selector switching relay 910, and removes ground from conductor 1412 to release trunk busy relay 1410, and thereby advance the toll select relays. Meanwhile, the selector line relay 920 having restored, following the operation of the switching relay, opens the circuit of the slow to release hold relay 930, which also restores, after a slight delay, but this is now without effect.

In case all toll trunks are busy, relay 1490 being normal, break contacts 1492 will pass ground back over "busy" conductor 1309, through contacts 1313A, conductor 1268A, cable 1291, springs of the trunk access relays 1205, cable 990, conductor 988 and break contacts 915 to busy relay 940, which operates and locks. Relay 940, at make contacts 942 connects busy tone from conductor 525 to the calling trunk through repeater 900, at break contacts 943 opens the operate circuit to the switching relay 910, and at break contacts 945 opens the circuit of the operated access relay which restores and releases group relay 1310.

If, with trunks available, either the marked units relay or the switching relay fails to operate for any reason, so that the selector does not switch through, the kickoff relay, not shown, in the incoming trunk access group 1205 will restore, in the manner already explained for kickoff relays 1050 and 1250. This will ground conductors 1260A and 988 to advance the trunk select relays and again operate the busy relay 940.

*Calls from manual office*

Subscriber calls from the manual office are of course, dialled up by an operator, and come in through a repeater, but are otherwise similar to purely local calls. If for example, an operator has seized the trunk leading to repeater 149 in Fig. 1 to extend a call, seizure of the repeater takes place, and the repeater thereupon removes ground from conductor 1096 to advance the trunk select relays, and places a bridge across conductors 144 and 145 for the seizure of the associated line circuit.

Line relay 140 now operates, and grounds the marking conductors 147 and 148, thereby causing the operation of the T90 tens marking relay 320 and the U1 units marking relay 340. Make contacts 341 ground the finder start conductor to seize a free link by operating the connect relays 250 and 260 thereof, while make contacts 321 and 345, cause the operation respectively of the finder T90 tens relay, not shown, and the finder 1–6 units relay 220. The finder tens and units relays thereupon extend the line circuit line and test conductors 144, 145 and 146 through to the associated selector, which returns dial tone over the line conductors, and ground over the test conductor to the line circuit cutoff and lockout relays. The distant operator, upon hearing the dial tone, dials the required five digit call number through the repeater, which repeats the impulses in the well known manner. The local equipment responds exactly as described for a local call, and completes the connection in the usual way.

*Calls from toll office*

Calls from a toll operator, like calls from the manual office, also come in through a repeater, but are handled somewhat differently. Thus, assuming seizure of repeater 139 by a toll operator, this repeater thereupon places a bridge across the line conductors 114 and 115 to operate line relay 110, and at the same time removes ground from conductor 1412, to release the associated trunk busy relay 1410 in Fig. 14, and thereby advance the trunk selecting relays in the normal manner.

Line relay 110 upon operating, at make contacts 112 makes the trunk busy at the selector, and at make contacts 111 and 113 grounds the marking conductors 137 and 138 to Fig. 3, thereby operating the T10 tens marking relay 310 and the U1 units marking relay 340. Make contacts 341 again ground the finder start conductor 357 to seize an idle finder by operating the connect relays 250 and 260 therein, while ground from make contacts 317 causes the operation of discriminating relay 318. Relay 318 in turn, at make contacts 368, causes the toll trunk identification relay 580 in the selector to operate over the following circuit: ground at make contacts 346, contacts 368, conductor 358 across Figs. 1, 2 and 5, and the upper winding of relay 580 to battery. Relay 580 thereupon, at make contacts 581 prepares a locking circuit for itself, and at make contacts 582 grounds the toll call identification conductor 506.

Upon the operation of the finder connect relays, make contacts 261 cause seizure of the associated selector, and the operation of the line, pulsing, hold and hold slave relays 520, 530, 540 and 560 therein, whereupon relays 540 and 560 ground the test and hold conductors 275 and 276 in the usual manner. The toll trunk identification relay 580 locks up to the ground on the hold conductor, and at contacts 581 extends this ground also to the "B" conductor 272. The finder connect relays also, at make contacts 251 cause the operation of tens relay 210, from ground at contacts 311, over conductor 301 and cable 399, and at make contacts 262 cause the operation of units relay 220, from ground at contacts 345, over conductor 391 and cable 397.

The finder tens and units relays 210 and 220 upon operating, pass ground from test conductor 275 back through break contacts 243 and make contacts 223 and 215 to the line test conductor 116 and the trunk line cutoff and lockout relays 130 and 120. Relay 210 also, at contacts 211 connects ground from conductor 272 to the toll call identification conductor 271. The trunk line cutoff and lockout relays 130 and 120 now operate, from the ground on conductor 116 to disconnect the line relay 110 and to release the tens and units marking relays of Fig. 3. The finder connect relays now also release. Make contacts 261 thereupon open and switch the circuit of the selector line relay 520 through to the repeater, by way of break contacts 241 and 242, make contacts 221 and 222, make contacts 213 and 214, and line conductors 114 and 115. Dial tone from the selector now passes back over this circuit, through the repeater and back over the trunk to the toll operator's position, where it is made audible in the operator's headset.

Assuming that the call is for station "A" in Fig. 1, to which has been assigned the call number "22011," the operator, on hearing the dial tone, will proceed to dial this number, the various digits of which are duly repeated by the repeater, over conductors 114 and 115.

Upon the dialing of the first digit "2," the selector line and pulsing relays 520 and 530 respond in the usual manner, and advance the register of Fig. 8 two steps, leaving relays 820 and 817 operated. When transfer relay 819 releases therefore, following the second pulse it passes ground from conductor 508 through make contacts 822 and 823 on counting relay 820 to the selector tens relay 720 and trunk access relay 1010, both of which operate. Relay 1010 then operates trunk group relay 1060 from ground at make contacts 1011, by way of conductor 869, contacts 849 and 825 and conductor 866. Relay 1060 thereupon seizes the trunk select relays of Fig. 11, which, assuming the first connector to be again available, pass back ground over conductor 1129 to the selector 1–6 units relay 620, through contacts 1067 and 1017 and conductor 651. The trunk select relay 1120 also at contacts 1124 and 1125 extends toll identification ground to relays 1670 and 1660 in the stated first connector, thereby causing the operation of these relays. The circuit for relay 1670 is as follows: ground at contacts 582, conductor 506, cable 658, conductor 506 in Fig. 10, make contacts 1013A and 1063A, conductor 1158, make contacts 1124, conductor 1113 to the bottom of Fig. 15, and thence to the lower winding of relay 1670 to battery. The circuit for relay 1660 is from ground on the hold conductor 276 from make contacts 561, through make contacts 581, conductor 272, make contacts 211, conductor 271 across Figs. 5 and 6, cable 658, conductor 271 in Fig. 10, make contacts 1015A and 1065A, conductor 1149, make contacts 1125, conductor 1114 to the bottom of Fig. 15, and thence through the lower winding of relay 1660 to battery.

The selector units relay 620 upon operating, at make contacts 627 extends test conductor ground to switching relay 510 in the usual way, and relay 510 operates to switch the repeater through to the connector. The connector line, pulsing, hold, and hold slave relays 1510, 1530, 1540 and 1550 thereupon operate, in readiness for the next digit, and relay 1550 returns ground on the test conductor 744 preparatory to the release of selector relays 520, 530, 540 and 560, which release in succession following the operation of switching relay 510. The toll identification relays 1660 and 1670 now lock to conductor 744 preparatory to the release of the selector register and trunk selecting equipment, which also follow the operation of the switching relay 510. These relays 1660 and 1670 in the present instance, merely open the reverting call hold circuit, and prepare a circuit to the verification relay 1760. They may also serve to disconnect the conversation timing circuits if employed.

The second digit "2" of the call number "22011" now causes the connector register to count off two steps, leaving relays 1920 and 1987 operated, with transfer relay 1700 operating as usual on the first pulse and releasing shortly after the last pulse. On the release of relay 1700 therefor, break contacts 1701 pass ground from the now grounded conductor 1603 to conductor 2, and thence by way of make contacts 1923 and conductor 1626 to the code group select relay 1730, which thereupon operates to select the first group of ringing codes. Relay 1730 also, at contacts 1732 passes ground to register release relay 1560 which operates. This in turn releases the register, and causes the digit transfer relay 1780 to operate, in series with relay 1730, to prepare for the third or tens selecting digit.

The third digit "0" of the call number now causes the connector register to count off ten steps, leaving relays 1900 and 1997 operated. Upon the release of transfer relay 1700 following the last pulse of the digit, break contacts 1701 pass ground from the again grounded conductor 1603 to conductor 4 and thence by way of make contacts 1904 and conductor 1840 to connector tens relay 1800 which accordingly operates and grounds conductor 1709 to again operate register release relay 1560. Relay 1560 in turn again releases the register, and causes the digit transfer relay 1770 to operate in series with tens relay 1800, in readiness for the fourth or units selecting digit.

The fourth digit of the call number "22011" now causes the connector register to take a single step, leaving register relays 1910 and 1997 operated. Upon the release of transfer relay 1700 therefore, shortly thereafter, break contacts 1701 and 1702 pass ground to conductor 5 and thence to the connector 1–6 units relay 1820, by way of make contacts 1915, conductor 1841, and make contacts 1801. Units relay 1820 thereupon operates and grounds conductor 1797. This ground, passing through break contacts 1796, again operates register release relay 1560, which in turn releases the register and causes the operation of digit transfer relay 1790, preparatory to the receipt of the fifth or ringing digit. Units relay 1820 also, at contacts 1821, 1822 and 1823 extends the connector talking and test conductors through to the called line talking and test normal conductors 184, 185 and 186. Upon the operation of digit transfer relay 1790 therefore, assuming the called line to be idle, switching relay 1720 operates over the test conductor 186, in series with the called line cutoff and lockout relays 190 and 180, which also operate.

The fifth digit "1" now causes the connector register to again count off a single step, thereby again operating and locking relays 1910 and 1997. When therefore, transfer relay 1700 again restores break contacts 1701 and 1702 pass ground from conductor 1603 through make contacts 1773 and 1794 to conductor 1684 and thus to digit transfer relay 1610 which operates and locks, to prepare the operation of pickup relay 1630. Pickup relay 1630 thereupon operates at the start of the next ringing cycle, and the connector rings the called line in the same manner as described for a local call, with ringing relay 1640 now responding to the first code of the first group of codes, from interrupter pulses on ringing conductor R1, by way of make contacts 1912 and conductor 1607.

When station A answers, back bridge relay 1590 operates to cut off the ring and release the register, and the connection is complete.

If the called line is busy however, ground will be on the test conductor 186 instead of battery. When therefore, the connector units relay operates, following the fourth digit of the call number, busy relay 1710 will operate from this ground, through break contacts 1792, and prevent the operation of switching relay 1720. Relay 1710 thereupon locks to ground on conductor 1506 and connects busy tone to the calling toll trunk.

The toll operator may now cut in on the busy connection and offer the call, by dialing an extra digit "1." The connector line and pulsing relays respond in the usual manner and pulsing relay 1530 passes a short ground pulse to the verification relay 1760 over the following circuit: ground, break contacts 1531, make contacts 1552, pulsing conductor 1518, make contacts 1614 and 1662, conductor 1682, break contacts 1723 and 1754, and the winding of relay 1760 to battery. Relay 1760 operates over this circuit and on the break of the pulse, vertification relay 1750 operates in series therewith, through make contacts 1761, from ground on conductor 1529.

Verification relay 1750 upon operating, at break contacts 1754 opens the original circuit of relay 1760, at break-make contacts 1753 transfers the locking circuit of the slow to release busy relay to the test conductor, at break contacts 1752 opens the busy tone circuit, and at make contacts 1751 and 1752 closes a dry talking circuit through to the busy line, by way of conductors 1503 and 1505 and the talking condensers C1 and C2 in Fig. 15. The operator may then converse with the called subscriber, and offer the call.

If the call is accepted, the conversing parties hang up, and battery replaces ground on the test conductor 1706. This shunts down busy relay 1710, which accordingly restores, after a slight delay. Upon the closing of break contacts 1715, the switching relay 1720 operates over the test conductor, in series with the line circuit cutoff and lockout relays and these relays reoperate. The connector now rings, and when subscriber "A" answers, the connection is completed in the regular manner.

The verification relays are also used by the toll operators to verify the call number of a calling subscriber wishing to make a toll call. After receiving the number of the calling party, the operator dials this number back over a different trunk, and upon receiving the busy signal dials the extra digit and asks the calling subscriber to hang up for a moment. This permits the new call to switch through and the operator then frees the first trunk. In this way subscribers are prevented from cheating by giving the wrong number for the originating station.

The invention having now been described, what is considered new and is desired to have protected by Letters Patent is set forth in the claims following.

What is claimed is:

1. In a telephone system, a plurality of groups of trunks, a plurality of switches having access to said trunk groups, said switches divided into a plurality of switch groups with a plurality of switches in each switch group, a digit register for each switch and circuits controlled thereby, a group of trunk access relays individual to each switch group, each group of trunk access relays comprising a relay individual to each switch in the corresponding switch group operative from said register over one of said circuits in response to the receipt of impulses indicating a trunk call number by the corresponding switch, a group of trunk group relays individual to each trunk group, each group of trunk group relays comprising a relay individual to each switch group operative from said register over another of said circuits in response to the receipt of impulses representing the call member of the corresponding trunk group by a switch in the corresponding switch group, a group of trunk selecting relays individual to each trunk group, each group of trunk selecting relays comprising a relay individual to each trunk in the group circuits for said last relays for operating the same in a definite order under control of said trunks, in accordance with the idle or busy condition of the individual trunks in the corresponding trunk group, chain circuits for said access and trunk group relays for causing only one of said individual relays in one of said groups of trunk access relays and only one of said individual relays in one of said groups of trunk group relays to be operated at a time in response to a plurality of said switches receiving impulses representing a trunk call member, circuit connections extending from said switches and controlled by the operated trunk access relay and the operated trunk group relay for extending said connections to the group of trunk selecting relays of the trunk group corresponding to the operated trunk group relay, trunk connecting relays in each of said switches for connecting said switches to an idle trunk in any of said trunk groups, and means for operating the trunk connecting relays in the calling switch over said extended connections in accordance with the operated condition of said trunk selecting relays of the selected trunk group to complete a trunk call to an idle trunk in the selected trunk group.

2. In a telephone system, a plurality of trunk groups, a plurality of groups of relay type selector switches having access to said trunk groups, a group of trunk access relays for each switch group, an access relay in each group of trunk access relays for each switch in the associated switch group and operative in response to the receipt of a call by the associated switch, a group of trunk group relays for each trunk group, a group relay in each group of trunk group relays for each switch group and operative in response to the associated trunk group being called from any switch in the associated switch group, a group of trunk selecting relays for each trunk group, a pair of relays in each group of trunk selecting relays for each trunk in the associated trunk group and operative in accordance with the idle or busy condition of the associated trunks, means for operating one of said access relays and one of said group relays in response to a call from the associated switch group, common circuit connections extending from said switches to the associated access relays, said circuit connections being further extended by the operated access and group relays to the trunk selecting relays associated with the operated group relay, trunk connecting relays in said switches for connecting said switches to an idle trunk in any of said trunk groups, means for operating the trunk connecting relays of the calling switch over said further extended circuit connections in accordance with the operated condition of the selected trunk selecting relays to extend the call to an idle trunk in the called trunk group, a chain circuit in each group of trunk access relays for causing only one of the access relays therein to be operated at a time in order to cause the extension of only one call at a time in case a plurality of calls are received simultaneously by the same switch group, a chain circuit in each group of trunk group relays for causing only one of the group relays therein to be operated at a time in case a plurality of calls to the same trunk group are received simultaneously by different switch groups, and a chain circuit in each group of trunk selecting relays for controlling the operation of certain of the relays therein to preselect idle trunks in the associated trunk group in rotation.

3. In a relay type telephone system, a plurality of trunk selecting relays for each trunk group of trunk groups including one or more inter-switch trunk groups and one or more inter-office trunk groups, a plurality of relay selectors each having access to any of said trunk groups, said selectors being also divided into groups, a group and comprising a preselect relay for each trunk in the corresponding trunk group, a group of trunk access relays associated with each selector group and comprising an access relay for each selector in the associated selector group, a group of trunk group relays associated with each group of trunk selecting relays and comprising a group relay for each selector group, tens and units relays in said selectors for extending connections to any of said trunk groups, counting relays in each selector responsive to a dialed digit for operating one of said tens relays to select a wanted trunk group, and for also operating one of said access relays and one of said group relays in accordance with the selector and trunk groups involved, units operating conductors extending from said units relays and said selectors to the associated access relays, said conductors being further extended by the operated access and group relays to the preselect relays of the trunk selecting relay group corresponding to the wanted trunk group, one of the units relays of the calling selector being operated from the selected preselect relays over one of said further extended conductors to extend the call to an idle trunk in the wanted trunk group, a chain circuit in each group of trunk access relays to cause only one of the access relays therein to be operated at a time, a chain circuit in each group of trunk group relays to cause only one of the group relays therein to be operated at a time, a chain circuit in each group of trunk selecting relays to cause the preselect relays therein to operate one at a time in rotation, and means in each selector responsive to the operation of any units relay therein to release the associated trunk access and trunk group relays and thus make these relay groups available for another call.

4. In a telephone system, groups of subscribers' lines, a plurality of groups of plural digit all relay connector switches having access to said subscribers' lines, an all relay intermediate single digit selector switch having access to said groups of connector switches, group relays in said selector switch corresponding to said connector groups, counting relays in said selector switch for selecting and operating a particular one of said group relays in response to the dialing of one of the digits in a called subscriber's number, a group of unit relays and a unit switching relay in said selector switch, each of said unit relays being operative to select either of two different connector switches in the selected group dependent upon the operated or non-operated condition of said unit switching relay, trunk selecting relays operative in response to the operation of said counting relays to select one of said connector switches in the selected group by operating said unit switching relay and one of said unit relays, said trunk selecting relays also being operative to select another of said connector switches in the selected group by operating said one unit relay without operating said unit switching relay, and means for operating the selected connector switch to complete the connection to the called subscriber's line.

5. In a telephone system, a plurality of groups of subscriber lines having plural digit call numbers, a plurality of groups of all relay connector switches having access respectively to said groups of subscriber lines, one or more groups of trunk lines having single digit call numbers, an all relay single digit selector switch having access to said groups of connector switches and said groups of trunk lines, group relays in said selector switch corresponding to said connector and trunk line groups, counting relays in said selector switch for operating a particular one of said group relays in response to the dialing of the first digit of a called subscriber number to prepare the selection of a connector in the corresponding connector group, a group of unit relays and a unit switching relay in said selector switch, each of said unit relays being operative to select either of two different connector switches in the selected connector group, trunk selecting equipment external to said selector and also operative from said counting relays in response to the dialing of said first digit of the subscriber call number to select one of said two connector switches by operating one of said unit relays alone, said trunk selecting equipment being also operative at times to select the other of said two connector switches in response to the same digit by operating said one unit relay and said unit switching relay, means for operating the selected connector switch in response to the remaining digits to complete the connection to the called subscriber line, means for operating a different one of said group relays in said selector from said counting relays in response to the dialing of a single digit trunk call number to prepare the selection of a trunk line in the corresponding trunk group, each of said units relays being now operative to select either of two different trunk lines in the selected trunk group, said trunk selecting equipment being again operative from said counting relays in response to the dialing of said single digit call number to select one of said two trunk lines by operating one of said unit relays alone, said trunk selecting equipment being also operative at times in response to the same single digit call number to select the other of said two trunk lines by operating said last named unit relay and said unit switching relay, and means responsive to the operation of said unit relay for completing the connection to the selected trunk line.

6. In a telephone system, a plurality of groups of trunks, a plurality of switches having access to said trunks, said switches divided into a plurality of switch groups with a plurality of switches in each switch group, unit relays in each of said switches operable singly to complete connections to a portion of the trunks in any of said groups, a switching unit relay in each of said switches operable in combination with said unit relays to complete connections to the remaining portion of the trunks in said groups, a group of trunk access relays individual to each switch group, a group of trunk group relays individual to each trunk group, a group of trunk selecting relays individual to each trunk group for preselecting the first idle trunk in its group, means including a digit register therein responsive to a calling switch in one of said switch groups receiving pulses indicating a trunk call to one of said trunk groups for operating a corresponding one of said trunk access relays, a circuit completed responsive to the operation of said access relay for operating a corresponding one of said trunk group relays, and unit conductors for said unit and switching unit relays of said calling switch extended by said operated trunk access and trunk group relays to said trunk selecting relays for controlling the operation of said unit relays singly or in combination with said switching unit relay dependent upon which trunk in the called group has been preselected by said trunk selecting relays.

7. In a telephone system, a plurality of groups of trunks, a plurality of switches having access to said trunks, said switches divided into a plurality of switch groups with a plurality of switches in each switch group, a group of trunk access relays individual to each switch group, each group of trunk access relays including a relay individual to each switch in its corresponding group and each relay operative in response to the receipt of a trunk call by its corresponding switch, a group of trunk group relays individual to each trunk group each including a relay individual to each switch group and operative in response to the corresponding trunk group being called from the corresponding switch group, a group of trunk selecting relays individual to each trunk group each including a relay individual to each trunk in its group, circuits controlled from said trunks for operating said selecting relays in rotation in accordance with the idle or busy condition of said individual trunks to preselect idle ones of said trunks in rotation, a chain circuit in each group of trunk access relays for preventing the operation of more than one of said relays therein at a time in case a plurality of trunk calls are simultaneously received by the same switch group, a chain circuit in each group of trunk group relays for preventing the operation of more than one of said relays therein at a time in case a plurality of trunk calls to the same trunk group are simultaneously received by different switch groups, unit relays in each of said switches operable singly to complete connections to a portion of the trunks in any of said trunk groups, a switching unit relay in each of said switches operable in combination with its associated units relays to complete connections to the remaining portions of the trunks in said trunk groups, a digit register for each switch, means including said digit register responsive to a calling switch in one of said switch groups receiving impulses representing a trunk call to one of said trunk groups for operating the individual trunk access relay corresponding to the calling switch, circuits completed responsive to the operation of said access relay for operating the trunk group relay corresponding to the calling switch group and the called trunk group, and unit conductors for said unit and switching unit relays of said calling switch extended by said operated trunk access and trunk group relays to said trunk selecting relays corresponding to the called trunk group for controlling the operation of one of said unit relays or the operation of said switching unit relay and one of said unit relays dependent upon the trunk preselected in said called trunk group.

8. In a telephone system, a plurality of groups of relay type selectors, a plurality of groups of average traffic trunks accessible to said selectors, a group of heavy traffic trunks also accessible to said selectors, a first group of trunk access relays for each group of selectors comprising a first access relay for each selector in the corresponding selector group, a second group of trunk access relays for each group of selectors comprising a second access relay for each selector in the corresponding selector group, a group of trunk group relays for each trunk group comprising a group relay for each of said selector groups, a group of trunk selecting relays for each trunk group comprising a preselect relay for each trunk in the corresponding trunk group, said preselect relays operable automatically in rotation in accordance with the availability of the corresponding trunks to preselect the next idle one of said trunks, means including an associated impulse register responsive to a calling selector in one of said selector groups receiving impulses indicating a call to one of said average traffic trunk groups for operating a first access relay corresponding to said calling selector, a circuit closed by said operated access relay for operating a group relay corresponding to the calling selector group and the called average traffic trunk group, means including said impulse register responsive to a calling selector in one of said selector groups receiving impulses indicating a call to said heavy traffic trunk group for operating a second access relay corresponding to said calling selector, a circuit closed by said last operated access relay for operating a group relay corresponding to the calling selector group and the called heavy traffic trunk group, control circuits extended by such operated access and group relays from the trunk selecting relays corresponding to the called trunk group to the calling selector and for completing the operation of said selector over one of said control circuits to extend the call to the preselected trunk in the called trunk group, a chain circuit for each group of trunk group relays for preventing the simultaneous extension of simultaneous calls to the same trunk group by preventing the operation of more than one relay of the group at a time, and a chain circuit for each group of access relays for preventing the simultaneous extension of simultaneous calls to different ones of said average traffic trunk groups when such calls are received by selectors of the same selector group by preventing the operation of more than one access relay in a group at a time.

9. In a telephone system, a plurality of trunks, an all relay selector, units relays less in number than said trunks in said selector, contacts on said relays, said trunks accessible to said selector and connected to the contacts of said units relays, trunk selecting equipment external to said selectors and presettable by circuits controlled from said trunks for preselecting said trunks in definite order, a circuit completed in said selector responsive to the seizure thereof by a calling party to cause said selector to seize said trunk selecting equipment, one or more circuits completed by said equipment responsive to said last seizure to operate one or more of said units relays, dependent on the setting of said equipment, and connections completed by said operated units relays to the preselected one of said trunks through the contacts of such operated units relays.

10. In a telephone system, an all relay selector, an incoming trunk terminating in said selector, units relays and a units switching relay in said selector, contacts on said relays, a plurality of outgoing trunks accessible to said selector and connected to the contacts of said units relays, each of said units relays providing access to either of two different ones of said outgoing trunks depending on the operated or non-operated condition of said units switching relay, trunk selecting equipment for preselecting said outgoing trunks in sequence and comprising a select relay for each of such trunks, said select relays operative one at a time in accordance with the idle or busy condition of said trunks, means responsive to the seizure of said selector by a call on said incoming trunk for causing said trunk selecting equipment to be connected momentarily to said selector, and means in said trunk selecting equipment for thereupon operating one of said units relays alone or in combination with said units switching relay dependent on which of said select relays is operated to extend the call to the first idle one of said outgoing trunks.

11. In a telephone system, a plurality of all relay type selectors, a plurality of connect relays in each said selector, contacts on said relays, a group of trunks connected to said contacts, a group of trunk access relays common to said selectors comprising an access relay for each such selector, a trunk group relay, a group of trunk selecting relays associated with said trunk group relay and operative automatically in accordance with the idle or busy condition of said trunks to preselect idle ones of said trunks in sequence, means in each said selector responsive to the seizure of such selector by a call to operate the corresponding access relay and the said trunk group relay momentarily, operate circuits for said connect relays, said operate circuits being extended from such seized selector to said trunk selecting relays by said operated access and trunk group relays, means for thereupon operating one of the connect relays of said seized selector automatically from said trunk selecting relays over one of said extended operate circuits, in order to switch the call through to the preselected trunk, and a chain circuit in said group of trunk access relays to cause only one of said relays to be operated at a time.

12. In a relay type telephone system, a plurality of groups of regular selectors, a group of incoming selectors, a plurality of groups of normal-traffic trunks accessible to said regular selectors, a group of heavy-traffic trunks accessible to said regular selectors and said incoming selectors, a first group of trunk access relays associated with each group of regular selectors, each such relay group comprising a first access relay for each selector in the associated selector group, a second group of trunk access relays associated with each group of regular selectors, each such relay group comprising a second access relay for each selector in the associated selector group, a group of incoming trunk access relays associated with said group of incoming selectors and comprising an incoming access relay for each incoming selector, a group of trunk group relays for each of said normal-traffic trunk groups and comprising a normal-traffic group relay for each group of regular selectors, a group of trunk group relays for said heavy-traffic trunk group and comprising a heavy-traffic group relay for each of said selector groups including said incoming selector group, a group of trunk selecting relays for each trunk group for preselecting idle trunks in such trunk groups one at a time in rotation, a digit register in each said regular selector operated responsive to the receipt thereby of a dialled digit corresponding to one of said normal-traffic trunk groups for operating a first access relay corresponding to the calling selector and the calling selector group, a circuit completed by said operated access relay and register for operating a normal-traffic group relay corresponding to the calling selector group and the called trunk group, said register in each said regular selector also operative responsive to the receipt thereby of a dialled digit corresponding to said heavy-traffic trunk group for operating a second access relay corresponding to the calling selector and the calling selector group, a circuit completed by said second access relay for operating the heavy-traffic group relay corresponding to the calling regular selector group, circuit means in each said incoming selector responsive to the seizure thereof by a call for operating an incoming access relay corresponding to the calling incoming selector, a circuit completed by said incoming access relay for causing the operation of the heavy-traffic group relay corresponding to the incoming selector group, trunk connecting relays in each of said regular selectors, operate conductors extending from the trunk connecting relays of each regular selector group to the first and second groups of trunk access relays associated therewith, trunk connecting relays in each of said incoming selectors, operate conductors extending from said last named trunk connecting relays to the associated incoming trunk access relays, said operate conductors being extended by the operated access and group relays associated therewith from the calling selector to the trunk selecting relay group corresponding to the called trunk group, means in said trunk selecting relay groups for operating the appropriate trunk connecting relays in a calling selector over said extended operate conductors to switch the call through to the preselected trunk in the called trunk group, and chain circuits in said trunk access and trunk group relay groups to cause only one access or group relay in each such relay group to be operated at any given time.

13. In a telephone system, an all relay selector, a group of all-relay connectors accessible to said selector, a group of trunk select relays for preselecting idle ones of said connectors, a separate busy relay in said group of trunk select relays for each connector in said group of connectors, a busying position and a non-busying position for each said busy relay, means for causing the seizure of said selector by a call, a test conductor in said selector energized by such seizure, a tens relay and a group of units relays in said selector, counting relays in said selector responsive to a dialled digit for operating said tens relay and for causing said trunk select relays to be connected to said selector, one of said units relays being thereupon operated from said trunk select relays to extend said test conductor to the preselected connector, means in each connector responsive to such extension to cause the corresponding busy relay to assume its busying position and thereby prevent seizure of this connector by another call as long as it is so busied, and a switching relay in said selector also operated by said operated units relay to switch the call through to the preselected connector.

14. In a telephone system, an all-relay selector, a plurality of all-relay connectors accessible to said selector, a group of trunk select relays external to said selector for preselecting idle ones of said connectors in rotation, a busy relay in said group of trunk select relays for each of said connectors controlled from the associated connector in accordance with the idle or busy condition of such connector, a preselect relay in said group of trunk select relays for each of said connectors said preselect relays being operated automatically one at a time in rotation in accordance with the busy or idle condition of the corresponding connector and the resultant position of the corresponding busy relay, a test conductor and a pair of talking conductors in said selector, means for causing the seizure of said selector by a call, units relays in said selector, means in said selector responsive to dial pulses for causing said trunk select relays to be connected momentarily to said selector, one of said units relays being thereupon operated from the operated preselect relay to extend said talking and test conductors to the preselected connector, means in each connector responsive to the extension of said test conductor thereto for reversing the position of the associated busy relay in the trunk select relay group, a chain circuit in said trunk select relay group responsive to such reversal for causing the operation of a succeeding preselect relay and the release of the operated preselect relay to preselect the next idle connector, and a switching relay in said selector also operated by such operated units relay for switching the call through to said preselected connector over said talking conductors and for causing the disconnection of said trunk select relays from said selector.

JOHN H. VOSS.
ROY W. JONES.

REFERENCES CITED

The following references are of record in the file of this patent:

UNITED STATES PATENTS

| Number | Name | Date |
|---|---|---|
| 2,158,945 | Peterson | May 16, 1939 |
| 2,279,531 | Saunders | Apr. 14, 1942 |
| 2,333,039 | Peterson | Oct. 26, 1943 |
| 2,340,554 | Peterson | Feb. 1, 1944 |
| 2,431,540 | Voss | Dec. 2, 1947 |